(12) United States Patent
Mikhail et al.

(10) Patent No.: US 8,275,575 B2
(45) Date of Patent: Sep. 25, 2012

(54) DETERMINING COMPONENT FAILURE RATES USING ACCELERATED LIFE DATA

(75) Inventors: Amanda E. Mikhail, Rochester, MN (US); Mark D. Plucinski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 12/408,401

(22) Filed: Mar. 20, 2009

(65) Prior Publication Data

US 2010/0241400 A1    Sep. 23, 2010

(51) Int. Cl.
*G06F 17/18* (2006.01)
*G06F 17/50* (2006.01)
*G06F 11/22* (2006.01)

(52) U.S. Cl. .............................. 702/181; 703/1; 716/136

(58) Field of Classification Search .................. 702/181, 702/81, 84, 108, 117, 179, 182–185; 703/1–4; 324/500, 512, 750.01; 700/28–34, 52, 73–74, 700/95, 97, 108–110; 714/1, 25, 47.1–47.3, 714/100; 716/100, 132, 136

See application file for complete search history.

(56) References Cited

OTHER PUBLICATIONS

Hassanein et al., Quantile Estimates in Complete and Censored Samples From Extreme-Value and Weibull Distributions, Dec. 1984, IEEE Transactions on Reliability, vol. R-33, No. 5, pp. 370-373.*

Maurizio Guida et al., "Estimation of Probability Tails Based on Generalized Extreme Value Distributions," Reliability Engineering and system Safety 20 (1988); pp. 219-242.

James F. Slifker et al., "The Johnson System: Selection and Parameter Estimation," Technometrics, vol. 22, No. 2, May 1980, pp. 239-246.

Choudhury, Apurba et al, "Methodology for Connector Reliability Analysis", Proceedings of the Electronic Components and Technology Conference (ECTC), San Jose, California, May 18-21, 1997, pp. 928-935.

Coles, Stuart, "An Introduction to Statistical Modeling of Extreme Values," Chapter 4—Threshold Models, Springer, London, pp. 74-91, 2001.

Gumbel, E. J., "Statistics of Extremes," Columbia University Press, New York, Chapter 4—Analytical Study of Extremes, pp. 129-136, 1958.

Nelson, Wayne, "Applied Life Data Analysis," John Wiley & Sons, New York, Chapter 7—Exponential Data, p. 253, Jan. 2005.

Van Belle, Gerald, "Statistical Rules of Thumb," John Wiley & Sons, pp. 49-50, Mar. 22, 2002.

* cited by examiner

*Primary Examiner* — Toan M Le
(74) *Attorney, Agent, or Firm* — Matthew C. Zehrer (57) ABSTRACT

A method of statistical analysis is based on an accelerated degradation model for estimating the failure rate from a set of accelerated life data (e.g. stress, humidity, temperature, voltage, resistance, vibration, etc.). The method re-samples randomly distributed data and organizes it into subsets that may be ordered. The maximum is found for each subset. From the maximums a parametric LEV distribution is determined. Maximum Likelihood Estimation methods may be used to find the parameters employed in the determined LEV distribution. The failure rate is calculated using the determined LEV distribution of the sample maximums.

11 Claims, 10 Drawing Sheets

Randomly subdivide the sample. For example: 1,000 change in resistance values are partitioned into 10 equal parts.

| Table 1-1: 1st Subset of 100 ||
|---|---|
| Contact Number | Resistance Change (mOhm) |
| 1 | 1.223891 |
| 2 | 1.151879 |
| ... | ... |
| 99 | 1.422904 |
| 100 | 0.851585 |

| Table 2-1: 2nd Subset of 100 ||
|---|---|
| Contact Number | Resistance Change (mOhm) |
| 101 | 0.935737 |
| 102 | 1.736239 |
| ... | ... |
| 199 | 4.716376 |
| 200 | 3.550187 |

| Table 10-1: 10th Subset of 100 ||
|---|---|
| Contact Number | Resistance Change (mOhm) |
| 901 | 0.987813 |
| 902 | 3.117064 |
| ... | ... |
| 999 | 2.166511 |
| 1000 | 4.619953 |

Order each of the subsets

| Table 1-2: Ordering 1st Subset of 100 ||
|---|---|
| Contact Number | Resistance Change (mOhm) |
| 1 | 0.03835 |
| 2 | 0.131111 |
| ... | ... |
| 99 | 7.619794 |
| 100 | 8.462 |

| Table 2-2: Ordering 2nd Subset ||
|---|---|
| Contact Number | Resistance Change (mOhm) |
| 101 | -0.17526 |
| 102 | 0.02056 |
| ... | ... |
| 199 | 7.310713 |
| 200 | 30.27419 |

| Table 10-2: Ordering 10th Subset ||
|---|---|
| Contact Number | Resistance Change (mOhm) |
| 901 | -0.41315 |
| 902 | -0.11649 |
| ... | ... |
| 999 | 10.07453 |
| 1000 | 10.1476 |

Select the maximum from each of the 10 ordered subsets. This set now represents the sample of the Largest Extreme Value distribution.

| Table 2: Subset Maximums ||
|---|---|
| Subset Number | Max Resistance Change (mOhm) |
| 1 | 8.462 |
| 2 | 30.27419 |
| 3 | 12.61419 |
| 4 | 6.296102 |
| 5 | 8.170996 |
| 6 | 7.789506 |
| 7 | 8.583798 |
| 8 | 12.19646 |
| 9 | 13.19501 |
| 10 | 10.1476 |

Fig. 6

36 Fit the data from Table 2 to the LEV cumulative distribution:
$$F(x) = \exp(-\exp -(x-a)/b)$$

38 — Estimate parameters a & b

Ahat = Maximum likelihood estimate of a = 9.364401285
Bhat = Maximum likelihood estimate of b = 3.372579977

Fig. 7

Calculate the probability that a sample representing each subset of 100 is greater than a maximum allowable resistance, which is 10 mOhm in this example.

40

Prob (greater than 10 mOhm) =

$= 1 - \exp(-\exp -(x-a)/b)$
$= 1 - \exp(-\exp -(10-9.36)/3.37)$
$= 0.56317$

Fig. 8

Adjust the probability for the way the total sample was segmented into 10 sets of 100 data points each. Because each maximum "represents 100 data points".

42

Prob failure / contact =

$= $ (Prob for set of 100) / 100
$= 0.56318 / 100$
$= 0.0056318$

Fig. 9

Calculate the failure rate

Failure rate $= $ Probability (fail / contact) / Accelerated Stress Time

44

$$= \frac{\left(0.0056318 \frac{fail}{contact}\right) \times \left(10^6 \frac{ppm}{fail}\right) \times \left(1000 \frac{hours}{kpoh}\right)}{(7 \, years) \times \left(365 \frac{days}{year}\right) \times \left(24 \frac{hours}{day}\right)}$$

$= 91.84272075$ ppm/contact/kpoh

Adjust for bias. The maximum likelihood estimates can be biased for small sample sizes (10 in this example). The adjustment performed was based on an emprical simulation of known failure rates on groups of 10 sets of 100 data points for a range of failure rates. For this example the bias adjustment was 1.191466.

Unbiased failure rate

= biased failure rate * adjustment
= 91.84272075 * 1.191466
= 109.4275162 ppm/contact/kpoh

| Statistical Confidence Level | Lower Limit | Upper Limit |
|---|---|---|
| 80% | 56 | 149 |
| 90% | 41 | 160 |
| 99% | 4 | 169 |

DETERMINING COMPONENT FAILURE RATES USING ACCELERATED LIFE DATA

FIELD OF THE INVENTION

The present invention generally relates to statistically analyzing accelerated life data of a component, system, material, or process. More particularly embodiments of the present invention relate to calculating the failure rate of a component from accelerated life data.

BACKGROUND OF THE INVENTION

Accelerated life tests are conducted on components, systems, materials, and manufacturing processes to determine their useful life in the required product or application. Their purpose is to identify and quantify the failures and failure mechanisms which cause products to wear out at the end of their useful life. Separate accelerated life tests may be conducted for each potential wear out mechanism, since the stresses which produce failures are different for each mechanism. The test results are important to ensure the component, system, material, or process will operate as intended for a predetermined lifetime.

There are numerous accelerated life tests (e.g. reliability tests, environmental stress tests, etc.) each resulting in accelerated life test data. This data may be statistically analyzed to determine, for example, a failure rate of a component, product, or system.

Some statistical analysis methods (James F. Slifker and Samuel S. Shapiro, *The Johnson System: Selection and Parameter Estimation*, Technometrics Vol 22, No 2, May 1980) require a judgment on the part of the user to help fit the data. This results in the possibility of a different failure rate being calculated by different users, for the same accelerated life data.

SUMMARY OF THE INVENTION

A method for statistically analyzing accelerated life data is described. Although the method is directed to calculating the failure rate of a component, this process may be extended to other applications where the percentage of distribution above a critical value is to be determined. The method is based on an accelerated degradation model for estimating the failure rate from a set of accelerated life data (e.g. stress, humidity, temperature, voltage, resistance, vibration, etc.). The method re-samples randomly distributed data and organizes it into subsets that may be ordered. The maximum is found for each subset. From the maximums a parametric LEV distribution is determined. Maximum Likelihood Estimation methods may be used to find the parameters employed in the determined LEV distribution. The probability of a data point being above a theoretical max is calculated. The probability is adjusted for the way the data was segmented. The failure rate is calculated using the determined LEV distribution of the sample maximums.

In certain embodiments a method for selecting a particular component from a plurality of possible components comprises performing accelerated life tests on the plurality of possible components resulting in accelerated life data for each possible component; determining the type of statistical distribution of each accelerated life data set, and if a distribution is an unbounded distribution; determining the failure rate of each component by re-sampling the accelerated life data corresponding to each component, and; providing the particular component for use in the electronic system if the failure rate is below a threshold failure rate.

In certain embodiments the method for statistically analyzing accelerated life data is performed by a computer. In still another embodiment a computer program product carries a computer program embodied in a computer readable medium adapted to cause a computer to perform the method for statistically analyzing accelerated life data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 depicts an illustrative example of a particular instance of the method of FIG. 3. More specifically FIG. 4 depicts subdividing a set of accelerated life data into sub data sets, according to an embodiment of the present invention.

FIG. 5 depicts an illustrative example of a particular instance of the method of FIG. 3. More specifically FIG. 5 depicts ordering the sub data sets, according to an embodiment of the present invention.

FIG. 6 depicts an illustrative example of a particular instance of the method of FIG. 3. Specifically FIG. 6 illustrates determining a maximum change in resistance value for each sub data set, according to an embodiment of the present invention.

FIG. 7 depicts an illustrative example of a particular instance of the method of FIG. 3. Specifically FIG. 7 illustrates fitting the maximum data set to the LEV cumulative distribution function, according to an embodiment of the present invention.

FIG. 8 depicts an illustrative example of a particular instance of the method of FIG. 3. Specifically FIG. 8 illustrates determining the probability of failure of the maximums, according to an embodiment of the present invention.

FIG. 9 depicts an illustrative example of a particular instance of the method of FIG. 3. Specifically FIG. 9 illustrates adjusting the probability for the way the original data set was segmented, according to an embodiment of the present invention.

FIG. 10 depicts an illustrative example of a particular instance of the method of FIG. 3. Specifically FIG. 10 illustrates the calculation of a failure rate, according to an embodiment of the present invention.

FIG. 11 depicts an illustrative example of a particular instance of the method of FIG. 3. Specifically FIG. 11 illustrates the adjustment of the failure rate determined in FIG. 10, according to an embodiment of the present invention.

DETAILED DESCRIPTION

Embodiments of the present invention relate to a method for statistically analyzing accelerated life data. Although the method is directed to calculating the failure rate of a component, this process may be extended to other applications where the percentage of distribution above a critical value is to be determined. The method is based on an accelerated degradation model for estimating the failure rate from a set of accelerated life data (e.g. stress, humidity, temperature, voltage, resistance, vibration, etc.). The method re-samples randomly distributed data and organizes it into subsets that may be ordered. The maximum is found for each subset. From the maximums a parametric LEV distribution is determined. Maximum Likelihood Estimation methods may be used to find the parameters employed in the determined LEV distribution. The failure rate is calculated using the determined LEV distribution of the sample maximums.

In certain embodiments a method for selecting a particular component from a plurality of possible components comprises performing accelerated life tests on the plurality of possible components resulting in accelerated life data for each possible component; determining the type of statistical distribution of each accelerated life data set, and if a distribution is an unbounded distribution; determining the failure rate of each component by re-sampling the accelerated life data corresponding to each component, and; providing the particular component for use in the electronic system if the failure rate is below a threshold failure rate.

In certain embodiments the method for statistically analyzing accelerated life data is performed by a computer. In still another embodiment a computer program product carries a computer program embodied in a computer readable medium adapted to cause a computer to perform the method for statistically analyzing accelerated life data.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 13, is not intended to limit the scope of the invention, as claimed, but is merely representative of selected embodiments of the invention.

Reference throughout this specification to "one embodiment" or "an embodiment" (or the like) means that a particular feature, structure, methodology, or characteristic described in connection with the embodiment is included in at least one embodiment of the present invention. Thus, appearances of the phrases "in one embodiment" or "in an embodiment" in various places throughout this specification are not necessarily all referring to the same embodiment.

There are numerous accelerated life tests (e.g. reliability tests, environmental stress tests, etc.) each resulting in accelerated life test data. This data may be statistically analyzed to determine, for example, a failure rate of a component, product, or system. However obtaining meaningful and appropriate statistical results remains problematic. For instance, non parametric, distribution free statistical techniques such as utilizing a Chi-square distribution suffer from requiring large life data sample sizes to achieve a meaningful estimate. To get around the need for large sample sizes, a distribution from accelerated life tests may be fit to an empirical Johnson Family of distributions.

However, there are drawbacks in employing the Johnson family of distributions in determining, for example, the failure rate of a component. This technique attempts to find the best fit for the entire life test data distribution. However the failure rate of the component may be governed only by the upper tail, a small section of the distribution. Consequently, by trying to fit the entire distribution, additional and unknown variations may be introduced in the tails of the resulting fit. In addition, the Johnson family of distributions assumes a normal distribution to calculate the parameters (e.g. mean, standard deviation, etc.), which is an assumption that is not true in general.

Further, the Johnson family of distributions may also be unavailable for accelerated life data sets with unusual distributions or too few sample sizes. When a transformation of these data sets is calculated, resulting distributions are not well behaved. Because of the random nature of the data set, or if the distribution is random in and of itself, the algorithms used to calculate the parameters, in many cases, would result in negative numbers. When attempting a transformation these negative numbers yield complex numbers, and because these complex numbers are not defined in a probability space, no transformation is possible.

Extreme value theory (e.g. Largest Extreme Value) is used in statistics to study maximums of data. For example LEV is important for assessing risk for highly unusual events, such as 100-year floods. The LEV technique has been used to model extreme or rare events where such events have very negative consequences. Some examples of rare events include floods, snowfalls, higher wind speeds, extreme temperatures, large fluctuations in exchange rates, and market crashes. To develop appropriate probabilistic models and assess the risks caused by these events, business analysts and engineers frequently use the LEV distributions. Extreme Value distributions are concerned with the maximum or minimum of the data set. However within a data set, there may be many other data points of interest, but only the extreme is considered in LEV techniques.

Figure 1:
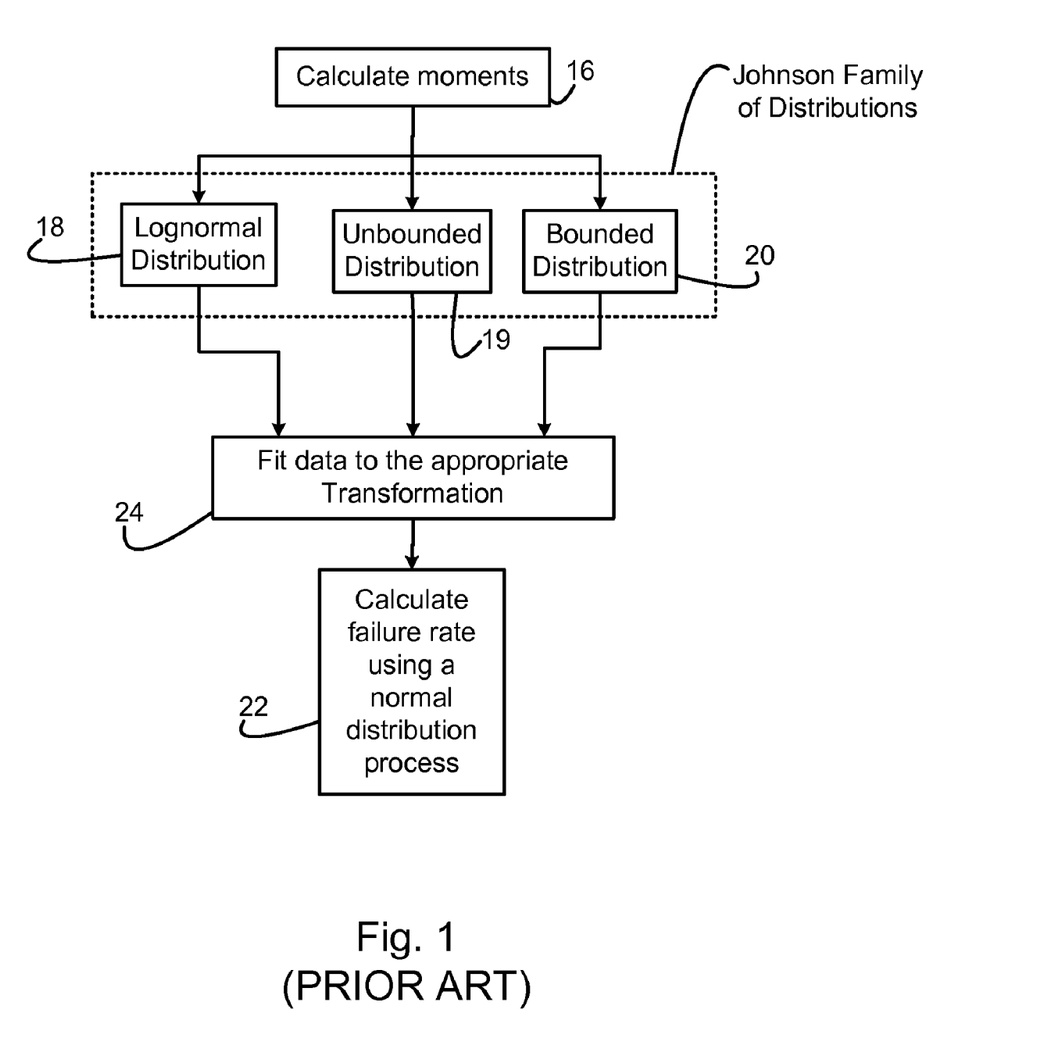
FIG. 1 depicts a prior art method of calculating a failure rate utilizing an appropriate Johnson Transformation.

FIG. 1 depicts a prior art method for calculating a failure rate. This method is utilized after obtaining accelerated life data to determine the most likely type of distribution. Depending on the type of distribution, the transformation used on the data differs. In order to determine what sort of distribution is most likely, four moments are calculated (block 16) from the data set. The four moments are the mean, standard deviation, skew, and kurtosis of the data set. Once calculated the combination of moments define the most likely type of distribution. Three such distributions may be lognormal, bounded, and unbounded, and together are known as the Johnson family of distributions. Depending on the type of distribution the appropriate type of transformation occurs (block 24). After the transformation, the data is assumed to be normally distributed.

The failure rate is calculated using a normal distribution process (block 22) as follows: The normal distribution is used to find the percentage of the distribution that is above a critical value. The percentage is the number of data points that exceed the critical value divided by the total number of data points. The failure rate is determined by dividing this percentage by a time unit. The proper time unit depends on the type of accelerated life data. For example, in an accelerated life test where a component is exposed to a gas for eight days representing seven years of aging, the percentage would be divided by seven years to determine a failure rate (failure rate units e.g. ppm/contact/kpoh, etc.).

Figure 2:
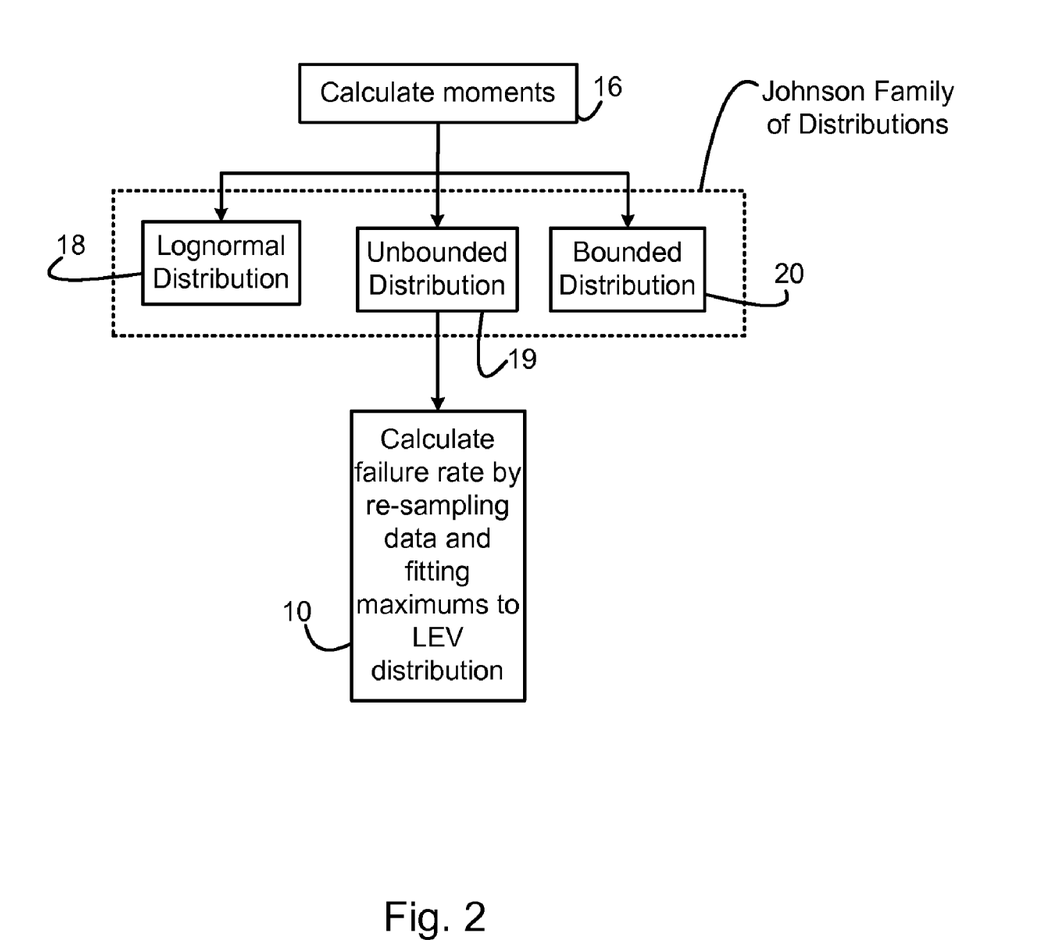
FIG. 2 depicts a method of calculating a failure rate, according to an embodiment of the present invention.

FIG. 2 illustrates a re-sampling method 10 of calculating a failure rate, according to an embodiment of the present invention. Re-sampling method 10 is utilized after obtaining accelerated life data that is of an unbounded distribution. Re-sampling method 10 re-samples randomly distributed data and organizes it into subsets that may be ordered. The maximum is found for each subset. From the maximums a parametric LEV distribution is determined. Maximum Likelihood Estimation methods may be used to find the parameters employed in the determined LEV distribution. The failure rate is calculated using the determined LEV distribution of the sample maximums. Further explanation of this method follows below.

Figure 3:
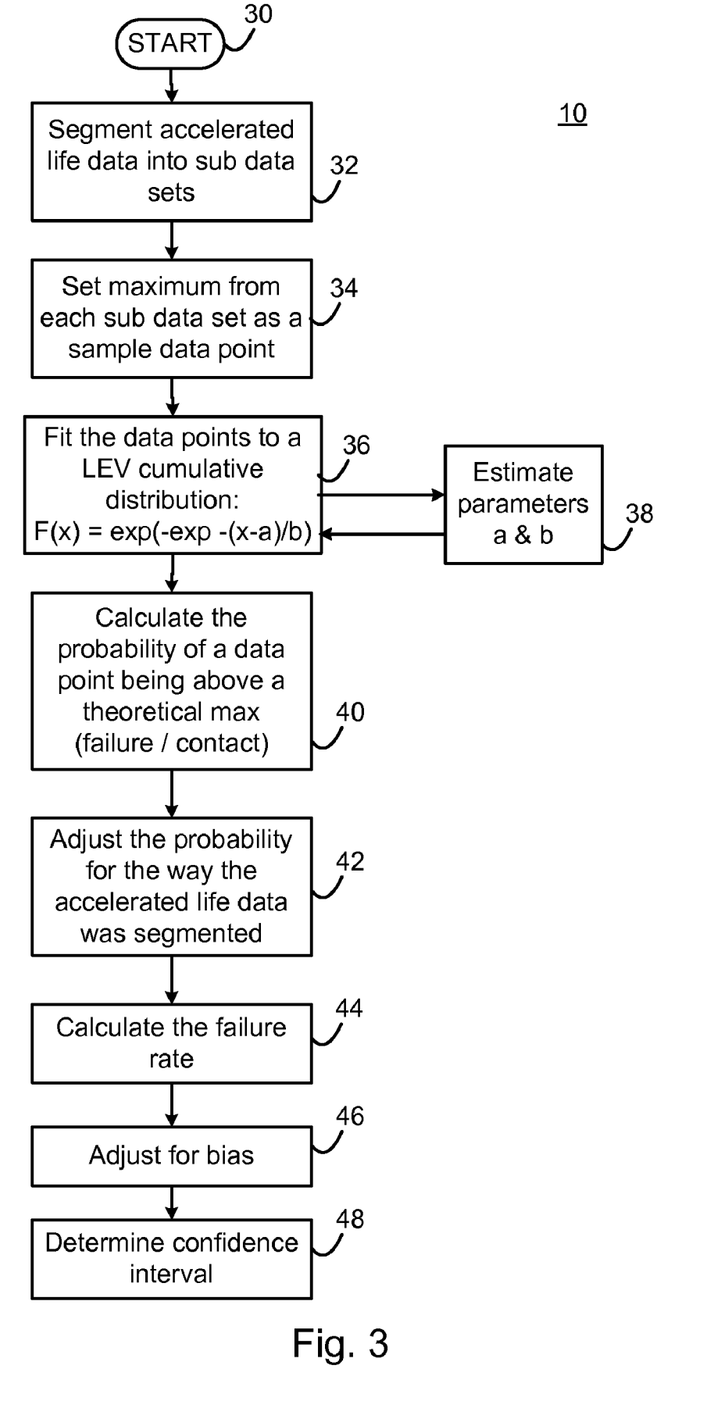
FIG. 3 depicts a method of calculating a failure rate by re-sampling accelerated life data and fitting the re-sampled maximums to a LEV distribution, according to an embodiment of the present invention.

FIG. 3 is an illustration of a flow chart of describing re-sampling method 10. Re-sampling method 10 starts at block 30 after obtaining a data set from an accelerated life test. The data set is segmented into a plurality of sub data sets (block 32). Each sub data set may be ordered (e.g. lowest numerical value to highest numerical value) to allow for the determination of the maximum value of an individual sub data set. The maximum from each sub data set is selected as a sample data point (block 34). The sample data points are fit to an LEV cumulative distribution (block 36). The LEV cumulative distribution may be: $F(x)=\exp(-\exp-(x-a)/b)$, where a and b are estimated parameters (block 38). The probability or percentage of data above a theoretical max or critical value is determined (block 40). The probability is adjusted for the way the accelerated life data was segmented (block 42). The failure rate is calculated (block 44) and adjusted for bias (block 46). A confidence interval may then be determined (block 48).

Figure 4:
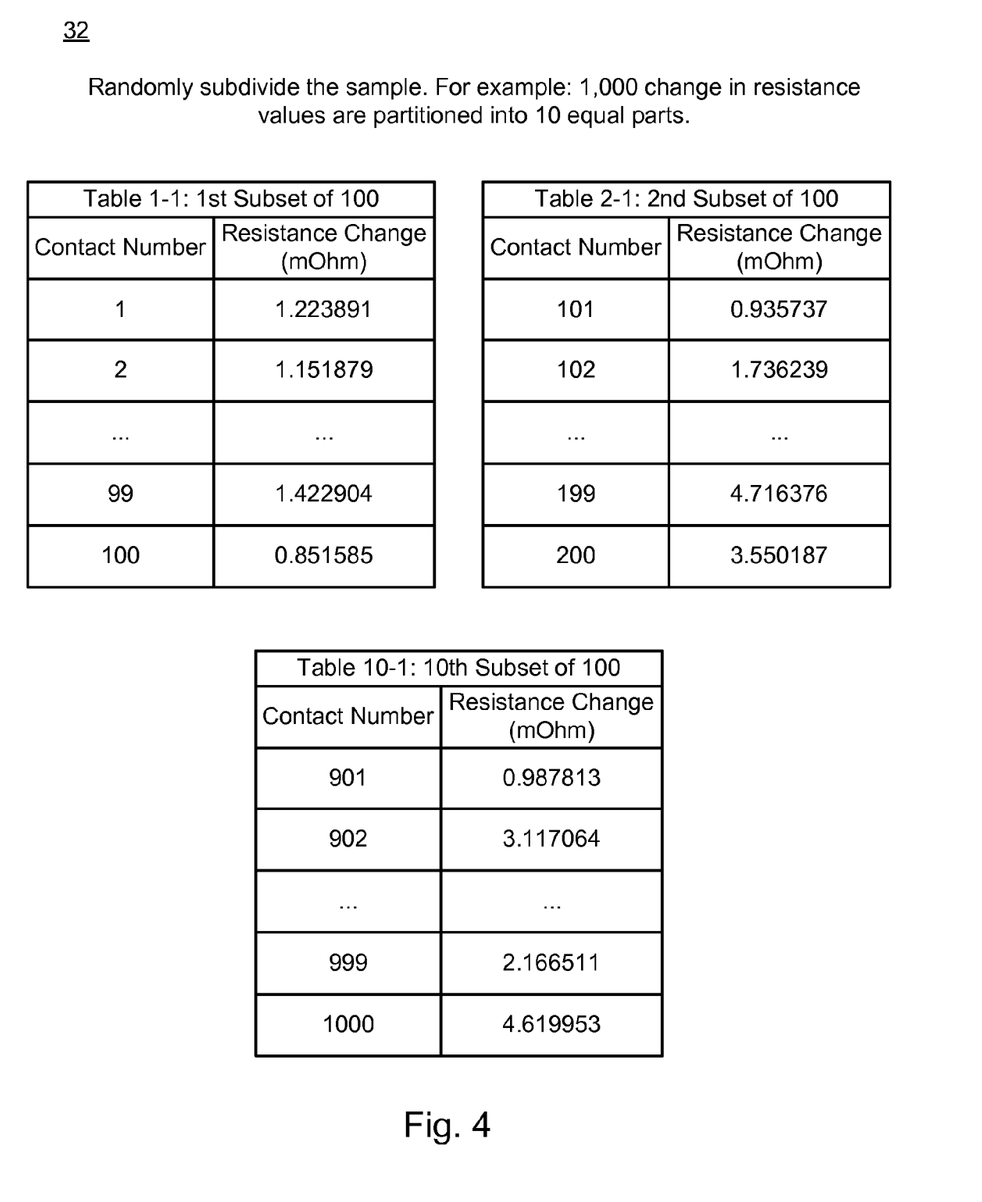

FIG. 4 depicts an illustrative example of a particular instance of LEV re-sampling method 10 based on an exemplary sample accelerated life data set. The exemplary life data set of for this example was randomly generated from a population with an unbounded Johnson distribution that had a failure rate of 100 ppm/contact/kpoh, and is found in the appendix infra. The exemplary accelerated life test measured the change in resistance between a first resistance prior to the accelerated life test and a resistance after the accelerated life test.

Specifically FIG. 4 illustrates an example of block 32: segmenting the accelerated life data into a plurality of sub data sets. After assembling or otherwise obtaining an accelerated life data set, randomly subdivide or otherwise partition the data set into sub data sets. For example, the 1,000 accelerated life data points are randomly subdivided into 10 subsets, each subset containing 100 data points. In a particular embodiment of the present invention each sub data set has a similar number of resistance values. Table 1-1 depicts a first sub data set of 100 resistance values. Table 2-1 depicts a second sub data set of 100 resistance values. Table 10-1 depicts a tenth sub data set of 100 resistance values.

Figure 5:
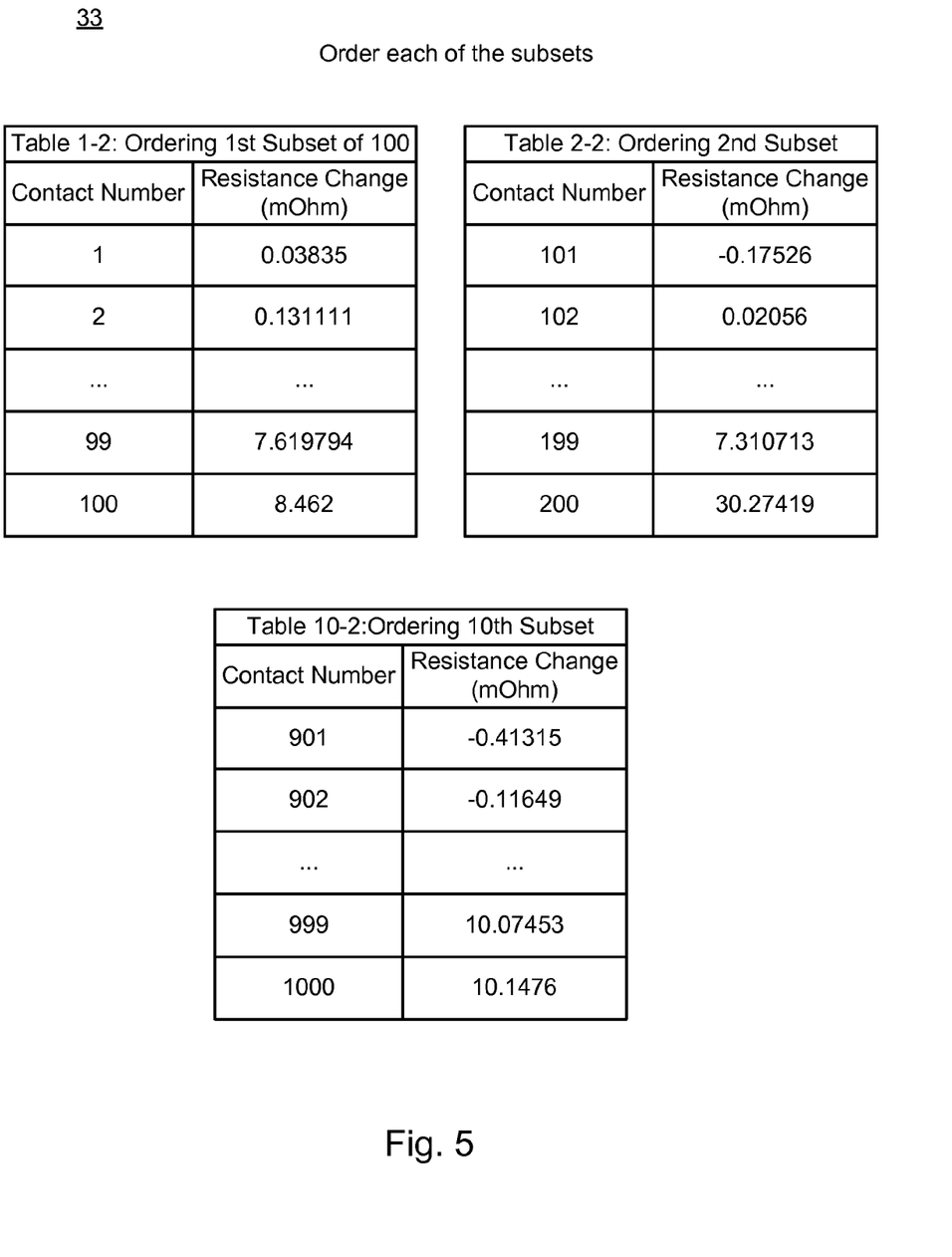

FIG. 5 depicts an illustrative example of a particular instance of LEV re-sampling method 10 based on an exemplary sample accelerated life data set. Specifically FIG. 5 illustrates an example of block 33 (optional and not shown in FIG. 3): ordering each sub data set. Once the data set is subdivided or otherwise partitioned into sub data sets, each data set may optionally be ordered. In a particular embodiment the data set is ordered from, for example, the least change in resistance value to the greatest change in resistance value. Table 1-2 depicts the ordered data set of table 1-1. Table 2-2 depicts the ordered data set of table 2-1. Table 10-2 depicts the ordered data set of table 10-1.

Figure 6:
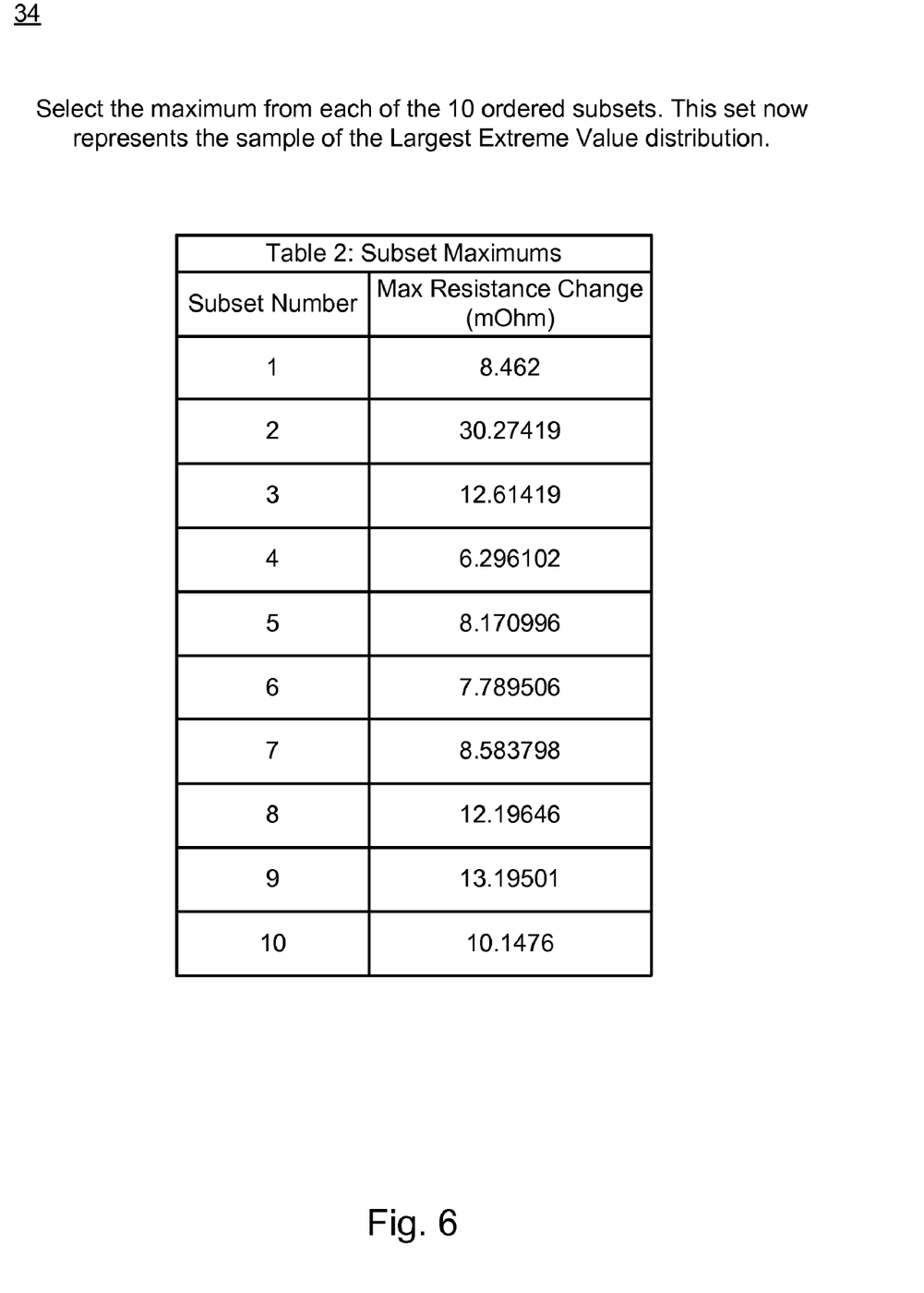

FIG. 6 depicts an illustrative example of a particular instance of LEV re-sampling method 10 based on an exemplary sample accelerated life data set. Specifically FIG. 6 illustrates determining a maximum change in resistance value for each sub data set (block 34). For example, the maximum from each of the 10 subsets is selected and is considered a maximum data set. This maximum data set now represents the sample of the Largest Extreme Value distribution. Table 2 depicts the maximum data set of the change in resistance values for each of the 10 sub data sets.

Figure 7:
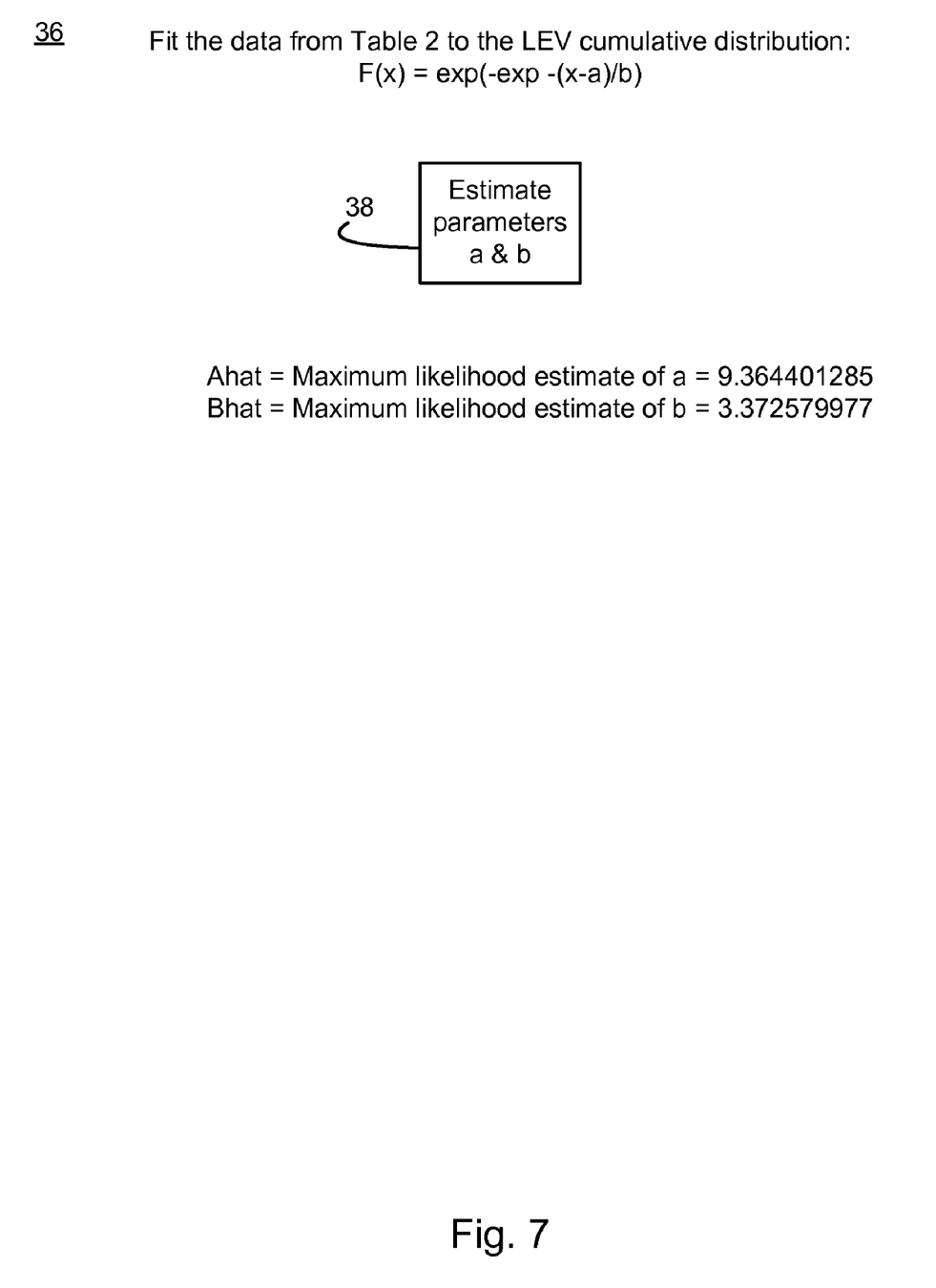

FIG. 7 depicts an illustrative example of a particular instance of LEV re-sampling method 10 based on an exemplary sample accelerated life data set. Specifically FIG. 7 illustrates fitting the maximum data set to the LEV cumulative distribution function:

$$F(x) = \exp\left(-\exp - \frac{(x-a)}{b}\right) \text{ (block 36).}$$

Parameters "a" and "b" are estimated (block 38). In the extreme value distribution, "a" is the location parameter, and "b" is the scale parameter. The parameters "a" and "b" may be estimated using maximum likelihood estimates (MLE) procedure as described the following paper: Estimation of Probability Tails Based on Generalized Extreme Value Distributions, Maurizio Guida, Reliability and Engineering Systems Safety, Vol 20 pg. 219-242, (1988).

Figure 8:
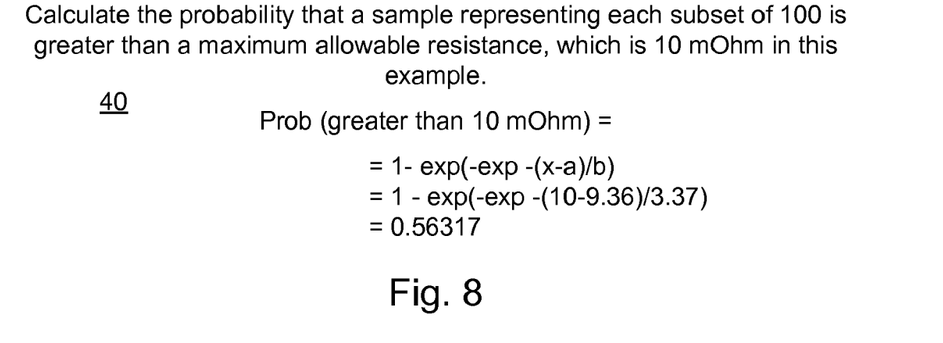

FIG. 8 depicts an illustrative example of a particular instance of LEV re-sampling re-sampling method 10 based on an exemplary sample accelerated life data set. Specifically FIG. 8 illustrates determining the failure rate of the maximums (block 40). In other words the probability or percentage of the maximum data points exceeding a maximum or critical value is determined. In the present example the maximum allowable change in resistance is 10 mOhm. The probability that the maximum from each sub data of 100 is greater than a maximum allowable resistance is determined by the following expression, where the $$\text{probability} = 1 - \exp\left(-\exp - \frac{(x-a)}{b}\right) =$$
$$1 - \exp\left(-\exp - \frac{(10 \text{ mOhm} - 9.36440)}{3.37257}\right) = 0.56318.$$

Figure 9:
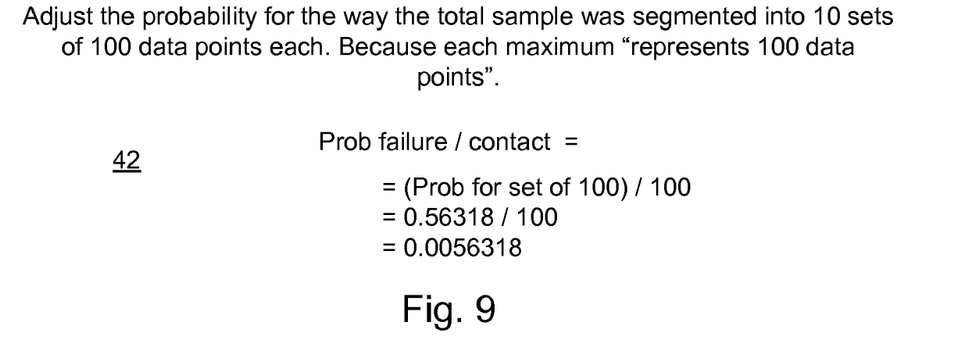

FIG. 9 depicts an illustrative example of a particular instance of LEV re-sampling method 10 based on an exemplary sample accelerated life data set. As shown in FIG. 9, the probability determined in FIG. 8 is adjusted for the way the original data set was segmented (block 42). This adjustment normalizes the maximum dataset to account for the sample size of the original dataset. In the present example, the original data set of 1000 data points was segmented into 10 sets of 100 data points each. The adjustment is occurs by dividing the probability determined in FIG. 8 by the number of data entries in each sub data set. In this example 0.56318 is divided by 100, because each sub data contains 100 entries. In the present example, the probability determined in FIG. 8/number of entries in each data set equals 0.56318/100=0.0056318.

Figure 10:
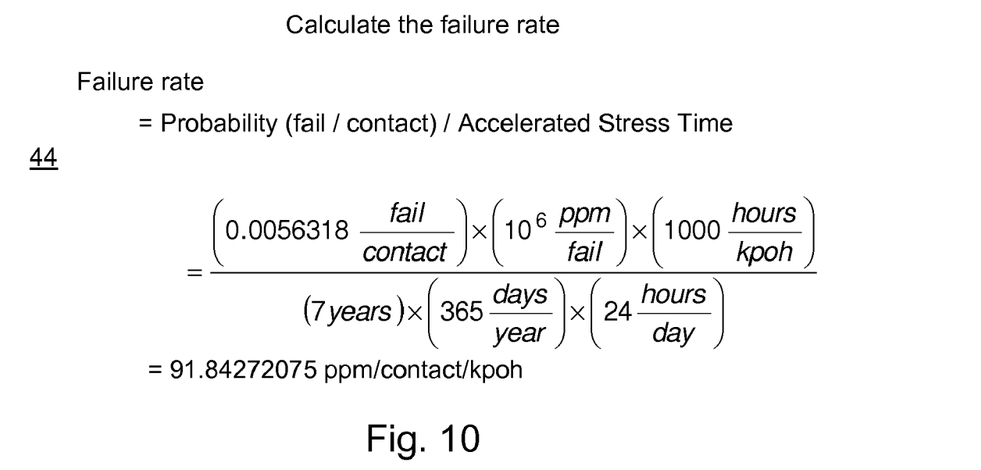

FIG. 10 depicts an illustrative example of a particular instance of LEV re-sampling method 10 based on an exemplary sample accelerated life data set. As show in FIG. 10, the failure rate is determined (block 44). The failure rate, in the present example, =Probability (fail/contact)/Accelerated Time. The failure rate $$\text{The failure rate} = \frac{\left(0.0056318 \ \frac{\text{fail}}{\text{contact}}\right) \times \left(10^6 \ \frac{\text{ppm}}{\text{fail}}\right) \times \left(1000 \ \frac{\text{hours}}{\text{kpoh}}\right)}{(7 \text{ years}) \times \left(365 \ \frac{\text{days}}{\text{year}}\right) \times \left(24 \ \frac{\text{hours}}{\text{day}}\right)} =$$

91.8428 ppm/contact/kpoh.

In the present example the accelerated life test simulated a 7 year period.

Figure 11:
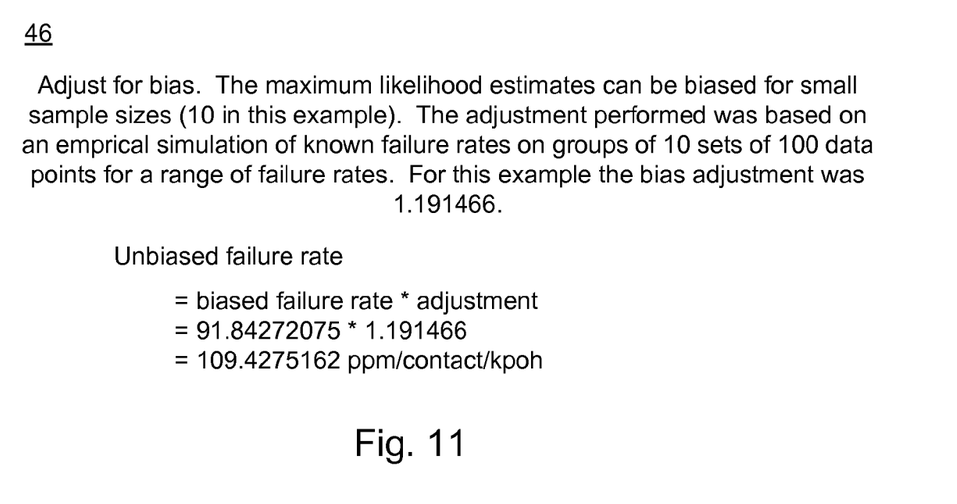

FIG. 11 depicts an illustrative example of a particular instance of LEV re-sampling method 10 based on an exemplary sample accelerated life data set. As shown in FIG. 11 the failure rate determined in FIG. 10 is adjusted for bias (block 46). Bias is the expected value of the estimation of the parameter minus the actual value of the parameter. If zero, the estimation is unbiased. A biased sample estimate results when using the maximum likelihood method. For small numbers of samples, the bias of the MLE method can be substantial. The adjustment performed may be based on an empirical simulation of known failure rates on groups of 10 sets of 100 data points for a range of failure rates to obtain an adjustment factor. The adjustment factor is determined by comparing the known failure rates with those calculated using the LEV technique from Monte Carlo simulations. For this example the bias adjustment was 1.191466. Therefore the unbiased failure rate equals the biased failure rate multiplied by the adjustment factor. This equals 91.8428*1.191466=109.43 ppm/contact/kpoh.

LEV re-sampling method 10 may also utilize confidence intervals (block 48). A confidence interval or confidence bound is an interval estimate of a population parameter. Instead of estimating the parameter by a single value, an interval likely to include the parameter may be given. Confidence intervals are used to indicate the reliability of an estimate. For instance a confidence interval may indicate the reliability of the calculated failure rate. A two-sided confidence interval contains the upper and lower bounds one would expect to find the true parameter level. As one desires a higher confidence level, the bounds generally increase, that is the distance between the upper and lower bound increases. If one has 100% confidence, then the interval would be infinitely long.

In an embodiment of the invention, confidence intervals may be determined for both parameters "a" and "b" of the Largest Extreme Value (LEV) distribution. In another embodiment confidence intervals may be determined for any percentile of the distribution. This is an advantage over the current techniques that find an estimate but may not quantify how good the estimate is, like the use of the empirically based Johnson family of distributions. Because the current techniques may not know the sampling distribution, the current techniques may only imply a best estimate. Re-sampling method 10 can utilize confidence intervals because the limiting distribution is known.

In an embodiment of the present invention an accelerated life test is performed upon a group of components. After for example a failure rate is determined, a confidence interval is determined corresponding to each failure rate. An engineer may utilize both the confidence interval and the average failure rate of each component to select a particular component to be utilized in a product. For example the engineer may select the particular component to be utilized in a product having a low failure rate and calculated using a high confidence level. In another example the nominal failure rate may be acceptable to the engineer, but the confidence interval may be too high (i.e. the failure rate is too high). The engineer may therefore increase the sample size of the next experiment.

The engineer may set the numerical statistical confidence level to match a desired need for accuracy, or general level of confidence. For example, the engineer may set the confidence level at 80% if the application is not critical, or where low cost is important. Or the engineer may set the confidence level at 99% if it is a critical application and high reliability goals are specified or the application involves human safety.

For example, data was used to obtain estimates of the "a" and "b" parameters according to blocks 30, 32, 34, 36, and 38. Because the distribution is known (as described above), techniques may be utilized to determine the confidence interval of the failure rate. One such technique is to find the simultaneous rectangular confidence region for both parameters "a" and "b". A 3-D plot of the failure rate as a function of the parameters "a" and "b" is determined. The upper and lower bounds of the surface are the limits of the failure rate. Once the 3-D plot is determined, the maximum and minimum failure rates may be found by a response surface technique or some other numerical method, one of which is discussed below.

Figure 12:
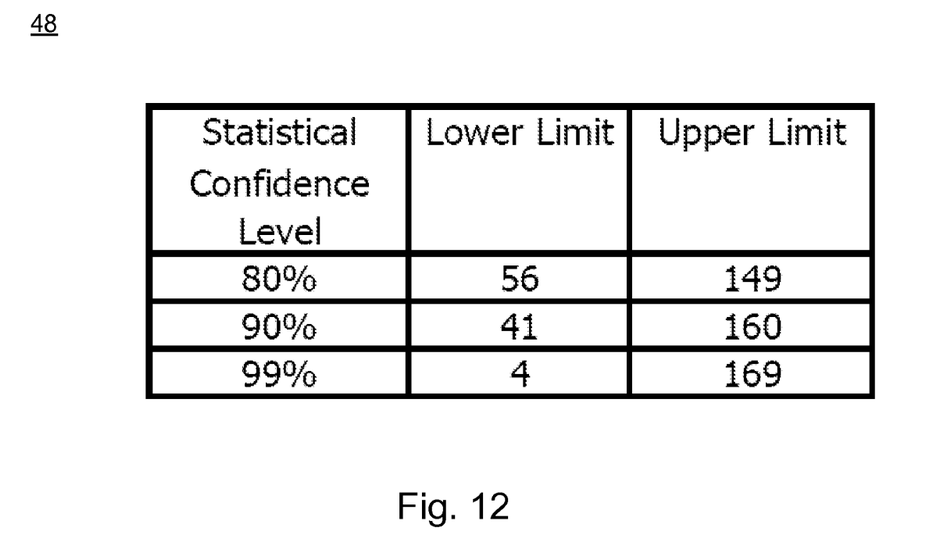
FIG. 12 depicts an illustrative example of various failure rates at various confidence levels, according to an embodiment of the present invention.

So as depicted by FIG. 12, confidence limits are obtained for the failure rate. Limits are found for low (80%), medium (90%), and high (99%) confidence levels. As seen in FIG. 12, one may be 80% confident that the failure rate is between 56 and 149 ppm/contact/kpoh, 90% confident that the failure rate is between 41 and 160 ppm/contact/kpoh, and 99% confident that the failure rate is between 4 and 169 ppm/contact/kpoh. In an embodiment, the engineer will specify a confidence level and the criterion prior to obtaining the data. For example, suppose the engineer had selected a maximum allowable failure rate of 100 ppm/contacts/kpoh, at a 90% confidence level. The engineer would then reject usage of this part given that the results calculated exceed the maximum allowable failure rate. The 99% lower confidence limit of 4 may suggest the actual failure rate may not be as bad as the data suggests. Perhaps an unusually bad sample of parts was used in the re-sampling method 10. Another sample of 1000 parts may be tested to determine if the failure rate for the sample of 2,000 pieces is acceptable.

Figure 13:
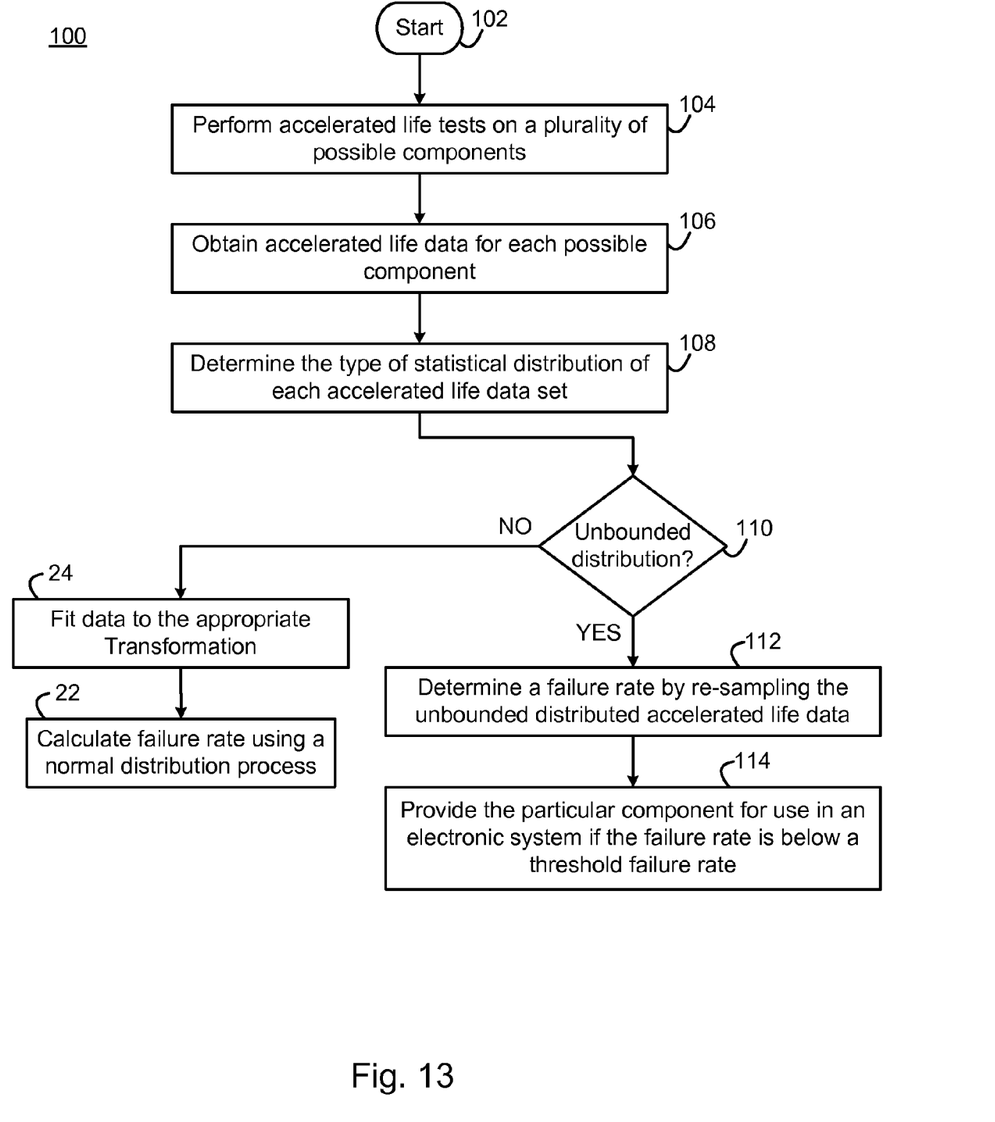
FIG. 13 depicts a method for selecting a particular component from a plurality of possible components, according to an embodiment of the present invention.

FIG. 13 depicts a re-sampling method 100 for selecting a particular component from a plurality of possible components, according to an embodiment of the present invention. Re-sampling method 100 for selecting a particular component from a plurality of possible components starts at block 102. Accelerated life tests are performed (block 104) on the plurality of possible components resulting in accelerated life data for each possible component (block 106). The type of statistical distribution of each accelerated life data set is determined (block 108). If a distribution is an unbounded distribution (block 110), a failure rate is determined by re-sampling the unbounded distributed accelerated life data (block 112). The particular component is provided for use in the electronic system if the failure rate is below a threshold failure rate (block 114). In another embodiment, re-sampling the unbounded distributed accelerated life data further comprises subdividing an accelerated life data set into a quantity of further sub datasets. In another embodiment, re-sampling the unbounded distributed accelerated life data further comprises selecting the maximum accelerated life data point from each sub dataset, where the selected maximums form a maximum dataset. In another embodiment, re-sampling the unbounded distributed accelerated life data further comprises fitting the maximum dataset to a Largest Extreme Value distribution. In another embodiment the Largest Extreme Value distribution as a function of "x" equals exp(−exp−(x−a)/b), and wherein "a" and "b" are parameters estimated using maximum likelihood estimates procedures. In another embodiment, re-sampling the unbounded distributed accelerated life data further comprises determining the probability that a sample from the maximum data set is greater than a predetermined critical value. In another embodiment, re-sampling the unbounded distributed accelerated life data further comprises adjusting the probability by dividing the probability by the quantity of further sub datasets; calculating the failure rate, and; adjusting for bias.

The accompanying figures and this description depicted and described embodiments of the present invention, and features and components thereof. Those skilled in the art will appreciate that any particular nomenclature used in this description was merely for convenience, and thus the invention should not be limited to use solely in any specific application identified and/or implied by such nomenclature.

It is to be understood that the present invention, in accordance with at least one present embodiment, includes elements that may be implemented on at least one electronic enclosure, such as general-purpose server running suitable software programs.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Appendix

TABLE A1

10 sets of 100 Resistances for Sample LEV ifr Calculation:

| Contact | Subset 1 | Subset 2 | Subset 3 | Subset 4 | Subset 5 | Subset 6 | Subset 7 | Subset 8 | Subset 9 | Subset 10 |
|---|---|---|---|---|---|---|---|---|---|---|
| 1 | 1.223891 | 0.935737 | 3.020118 | 2.506784 | 4.31292 | 3.166136 | 1.812467 | 7.084854 | 0.796037 | 0.987813 |
| 2 | 1.151879 | 1.736239 | 4.502436 | 0.720389 | 1.401402 | 0.765037 | 1.129718 | 2.826839 | 0.583135 | 3.117064 |
| 3 | 2.126412 | 0.02056 | 3.660316 | 1.428465 | 0.916454 | 3.294313 | 1.774379 | 8.109097 | 0.849804 | 3.673001 |
| 4 | 2.165783 | 1.66656 | 3.046573 | 1.008458 | 4.138659 | 1.163725 | 1.566444 | 1.341277 | 0.477434 | 1.98621 |
| 5 | 4.130866 | 3.279239 | 3.605533 | 3.249485 | 0.587374 | 2.58206 | 0.084755 | 2.228167 | 1.120431 | 1.845717 |
| 6 | 1.589894 | 0.036751 | 1.273676 | −0.36303 | 2.095155 | 2.546331 | 0.956131 | 0.440991 | 0.933665 | 1.924563 |
| 7 | 3.709176 | 0.483534 | 2.933231 | 2.587049 | 0.939737 | 3.219747 | 1.938725 | 1.655657 | 1.828936 | 0.809865 |
| 8 | 0.734576 | 1.078496 | 3.018099 | 2.541243 | 0.713793 | 2.933922 | 1.896435 | 0.369243 | 2.347182 | 3.868001 |
| 9 | 0.856884 | 1.361038 | 2.470485 | 4.432767 | 0.89951 | 2.445579 | 0.521875 | 1.227276 | 2.851852 | 4.312592 |
| 10 | 0.86208 | 1.027381 | 1.922325 | −0.15592 | 3.343656 | 2.225056 | −0.66037 | 0.251258 | 0.557507 | 1.123526 |
| 11 | 2.010445 | 1.295213 | 3.610053 | 0.786062 | 4.768249 | 6.262381 | 0.013914 | 4.77448 | 2.727424 | 0.780772 |
| 12 | 0.348571 | 0.207812 | 12.61419 | 1.097932 | 2.719829 | 0.997834 | 0.367447 | 0.358209 | 3.068238 | 1.795901 |
| 13 | 0.752566 | 2.780667 | 2.048984 | 1.533364 | 1.753242 | 1.252611 | 1.366509 | 2.24018 | 3.194614 | 1.814394 |
| 14 | 1.773382 | 3.489027 | 1.319049 | 0.480791 | 1.027371 | 3.969017 | 1.479591 | 2.629448 | 0.815768 | 0.918323 |
| 15 | 1.691392 | 3.269348 | 0.711359 | 3.028339 | 1.564321 | 5.909911 | 3.530855 | 2.261499 | 1.746161 | 1.418669 |
| 16 | 1.104005 | 1.403701 | 1.771488 | 2.902067 | 3.848178 | 4.155294 | 1.791882 | 4.725759 | 2.424099 | 0.630009 |
| 17 | 0.872123 | 1.110596 | 2.819023 | 0.48119 | 1.330117 | 4.58724 | 2.538379 | 0.206292 | 2.017495 | 1.385611 |
| 18 | 3.122286 | 3.486114 | 6.341065 | 1.244566 | 0.452372 | 1.501556 | 1.30264 | 2.455365 | 1.258867 | 2.822362 |
| 19 | 2.106154 | 3.244485 | 3.544742 | 0.71981 | 2.45479 | 1.040788 | 1.33116 | 2.067491 | 4.978893 | 1.295782 |
| 20 | 3.481664 | 3.92542 | 0.421453 | 1.305651 | 0.383821 | 1.414608 | 0.138508 | 5.279483 | 1.20625 | 3.180088 |
| 21 | 8.462 | 1.422703 | 1.466961 | 1.560926 | 2.786627 | 2.617858 | 3.083378 | 2.79314 | 1.120237 | 0.090552 |
| 22 | 0.03835 | −0.17526 | 2.585623 | 1.227804 | 2.649232 | 2.460954 | 3.335609 | 2.273357 | 1.025915 | 1.99598 |
| 23 | 2.086868 | 0.661292 | 10.52793 | 1.305136 | 2.319609 | 0.59299 | 3.884106 | 1.625696 | 1.748993 | 3.17642 |
| 24 | 6.522278 | 1.62958 | 1.231379 | 1.015189 | 0.655545 | 0.794966 | 3.836858 | 1.787564 | 8.407468 | 0.05839 |
| 25 | 0.339501 | 2.654313 | 1.317212 | 1.19181 | 0.67527 | 2.292443 | 1.531284 | 1.213181 | 2.288818 | 2.017633 |
| 26 | 0.840344 | 2.152921 | 0.453094 | 1.032794 | 2.632819 | 4.608136 | 1.526051 | 1.584687 | 0.574272 | 2.988243 |
| 27 | 0.95733 | 2.846116 | 5.589202 | 2.758246 | 1.753626 | 1.044315 | 2.655811 | 2.857659 | 2.351714 | 1.168363 |
| 28 | 1.30311 | 1.016589 | 1.532604 | 2.978102 | 1.75124 | 4.001767 | 1.98143 | 0.214749 | 2.206171 | 0.788108 |
| 29 | 1.381786 | 1.185299 | 1.759657 | 4.895019 | 0.960844 | 1.773424 | 1.729331 | 1.35212 | 2.759695 | 2.791977 |
| 30 | 3.293616 | 0.911144 | 1.639379 | 2.815607 | 4.444957 | 0.373576 | 1.407895 | 1.727594 | 6.11574 | −0.41315 |
| 31 | 1.140308 | 0.535001 | 2.210214 | 0.685994 | 1.520583 | 1.364814 | 1.639549 | 3.021709 | 2.033853 | 2.583485 |
| 32 | 1.810457 | 1.971732 | 10.71657 | 1.730296 | 0.404807 | 2.91854 | 1.459988 | 1.146489 | 1.316007 | 0.977403 |
| 33 | 3.046854 | 1.184464 | 2.426071 | 2.154516 | 0.979578 | 4.854721 | 1.06375 | 1.814901 | 1.716576 | 1.601358 |
| 34 | 5.517509 | 3.760656 | 1.174294 | 1.987645 | 4.148995 | 0.14569 | 1.069292 | 1.440035 | 0.172015 | 0.831965 |
| 35 | 0.556861 | 0.659684 | 2.272768 | 2.606464 | 1.542813 | 7.351255 | 2.458275 | 0.303127 | 2.106597 | 1.888542 |
| 36 | 1.503337 | 1.937748 | 1.060925 | 1.875285 | 0.517702 | 4.388503 | 0.126341 | 1.159608 | 1.209573 | 5.9405 |
| 37 | 0.963484 | 0.626361 | 3.048675 | 2.537382 | 1.153689 | 0.78555 | 4.300359 | 1.413393 | 3.934191 | 7.442511 |
| 38 | 0.544058 | 0.087 | 5.487671 | 2.801436 | 0.69528 | 0.528421 | 3.130244 | 0.839463 | 1.841927 | 1.712528 |
| 39 | 5.057095 | 0.121284 | 0.931129 | 4.525337 | 1.278558 | 1.514041 | 3.229754 | 1.347486 | 1.363455 | 1.150953 |
| 40 | 1.402657 | 2.939395 | 3.333236 | 1.065044 | 3.074675 | 0.877975 | 3.157112 | 2.099221 | 2.572032 | 1.165912 |
| 41 | 1.292161 | 2.6459 | 1.209712 | 0.221291 | 2.982074 | 0.900482 | 1.325192 | 4.570713 | 0.916889 | 2.933189 |
| 42 | 2.845789 | 3.496404 | 1.563298 | 6.296102 | 1.904455 | 0.939279 | 4.312324 | 1.016988 | 2.667815 | 0.622221 |
| 43 | 0.483149 | 1.164331 | 0.24845 | 1.216559 | 1.369498 | 1.335031 | 4.605852 | 0.815381 | 7.835976 | 1.129872 |
| 44 | 1.20937 | 1.096616 | 2.415676 | 1.578208 | −0.16546 | 3.302013 | 0.369142 | 1.836651 | 0.728827 | 1.586256 |
| 45 | 4.245694 | 1.260752 | 1.546883 | 4.048217 | 4.760292 | 2.295648 | 4.442872 | 0.813043 | 0.843632 | 1.415764 |
| 46 | 3.253619 | 4.826694 | 1.300157 | 2.956941 | 1.902309 | 0.596559 | 1.101418 | 3.986372 | 0.710908 | 3.916477 |
| 47 | 7.619794 | 0.785342 | 1.685402 | 1.900675 | 4.147529 | 2.36306 | 3.138999 | 1.536792 | 1.604597 | 1.8202 |
| 48 | 1.293352 | 0.665818 | 2.429325 | 0.832665 | 1.779297 | 2.136168 | 5.262642 | 1.74872 | 1.599125 | 1.386903 |
| 49 | 2.832379 | 2.273559 | 1.430306 | 2.853834 | 8.170996 | 2.105585 | 0.92815 | 3.801812 | 1.711032 | 0.16003 |
| 50 | 2.517309 | 1.365206 | 2.506345 | 2.985433 | 7.629953 | 1.391916 | 8.583798 | 1.13564 | 7.265125 | 0.356973 |
| 51 | 1.142211 | 1.712865 | 0.340558 | 1.818296 | 4.341955 | 1.808954 | 2.944182 | 1.300627 | 1.490326 | 1.207863 |
| 52 | 5.054253 | 2.250076 | 1.439188 | 0.40022 | 0.393908 | 0.937213 | 2.016991 | 2.87356 | 0.19834 | 0.888034 |
| 53 | 2.704012 | 2.169895 | 0.685474 | 0.677062 | 1.713499 | 0.41531 | 0.757193 | 2.864031 | 0.976698 | 0.004727 |
| 54 | 0.620139 | 4.365713 | 2.770751 | 2.265675 | −0.13614 | 0.570848 | 4.267747 | 4.348139 | 4.214113 | 0.629221 |
| 55 | 1.702144 | 0.084681 | 2.356618 | 2.978696 | 1.240577 | 0.400599 | 1.439355 | −0.0225 | 1.364584 | 0.588061 |

TABLE A1-continued

10 sets of 100 Resistances for Sample LEV ifr Calculation:

| Contact | Subset 1 | Subset 2 | Subset 3 | Subset 4 | Subset 5 | Subset 6 | Subset 7 | Subset 8 | Subset 9 | Subset 10 |
|---|---|---|---|---|---|---|---|---|---|---|
| 56 | 2.386782 | 4.128748 | 1.79138 | 1.193253 | 2.42362 | 1.298984 | 0.104397 | 1.197937 | 1.017386 | 2.461853 |
| 57 | 4.097074 | 1.895154 | 3.074544 | 1.246591 | 6.515682 | 1.593167 | 0.832532 | 5.367913 | −0.16354 | 0.710548 |
| 58 | 1.535744 | 30.27419 | 1.597522 | 2.767943 | 1.983028 | 1.042689 | 6.190113 | 2.258651 | 1.458193 | 2.349187 |
| 59 | 0.741383 | 1.090605 | 2.198201 | 1.118845 | 0.805152 | 2.348634 | 1.754449 | 3.126917 | 1.269829 | 10.1476 |
| 60 | 4.001323 | 0.371639 | 0.883453 | 2.390694 | 0.742537 | 3.24059 | 0.326835 | 2.361739 | 2.772146 | 1.43348 |
| 61 | 3.296498 | 2.459371 | 3.559951 | 4.343515 | 4.313755 | 7.789506 | 2.137864 | 3.127249 | 5.125327 | 1.75257 |
| 62 | 4.234312 | 7.310713 | 0.614038 | 1.062606 | 2.917477 | 0.439413 | 1.076932 | 0.818532 | 1.864455 | 3.586327 |
| 63 | 5.717011 | 1.047689 | 0.588203 | 1.443415 | 5.229651 | 1.517316 | 3.731981 | 1.580879 | 3.848714 | 2.975767 |
| 64 | 2.102298 | 1.86434 | 1.867906 | 1.279177 | 4.633267 | 1.547898 | 2.88927 | 0.518008 | 2.675051 | 1.489813 |
| 65 | 1.161958 | 1.5792 | 1.938355 | 0.906105 | 2.091409 | 0.61861 | 3.555315 | 2.4062 | 2.685832 | 0.943174 |
| 66 | 0.468739 | 2.042001 | 4.613342 | 1.567861 | 0.436385 | 1.006096 | 1.207382 | 2.10761 | 1.298348 | 2.599218 |
| 67 | 1.091998 | 1.228139 | 1.740861 | 4.512939 | 5.584969 | 0.821502 | 1.325531 | 1.090454 | 1.574246 | 2.189048 |
| 68 | 6.034668 | 1.054088 | 6.606189 | 0.813596 | 1.919399 | 5.658585 | 0.910839 | 4.358874 | 13.19501 | 2.636556 |
| 69 | 1.86467 | 1.106912 | 4.513126 | 1.370907 | 1.783114 | 1.727621 | 2.252029 | 0.824884 | 1.480782 | 0.924433 |
| 70 | 1.624203 | 0.575794 | 1.795147 | 1.026697 | 1.169737 | 3.25709 | 2.417146 | −0.51132 | 1.655709 | 0.823417 |
| 71 | 1.08239 | 2.233254 | 1.568873 | 1.114308 | 2.056762 | 2.066322 | 1.420147 | 6.808127 | −0.43371 | 0.037694 |
| 72 | 1.693959 | 0.905911 | 1.929058 | 1.537228 | 1.588132 | 0.776808 | 0.697679 | 4.773693 | 1.94289 | 0.477968 |
| 73 | 2.798903 | 0.914023 | 2.100104 | 2.762336 | 1.062785 | 3.052296 | 2.0088 | 1.288457 | 1.56292 | 2.098716 |
| 74 | 4.220009 | 2.771329 | 1.924916 | 0.453288 | 1.86075 | 2.594642 | 0.49241 | 0.541499 | 10.96617 | 3.161722 |
| 75 | 1.992421 | 1.281236 | 4.245165 | 2.95808 | 2.497972 | 1.097962 | 2.608354 | 0.634817 | 5.211963 | 2.448408 |
| 76 | 1.126132 | 3.776294 | 3.954124 | 4.256015 | 3.203055 | 6.087799 | 1.835401 | 0.75674 | 2.103357 | 1.275939 |
| 77 | 1.641574 | 2.87537 | 1.140184 | 1.053385 | 3.052101 | 2.31045 | 1.884134 | 3.471414 | 2.021563 | 1.180527 |
| 78 | 1.514436 | 0.849777 | 0.978481 | 1.908768 | 1.618529 | 1.688402 | 2.86362 | 12.19646 | 2.050686 | 1.363593 |
| 79 | 3.65464 | 3.378919 | 4.238269 | 2.272633 | 6.332108 | 3.826395 | 0.940954 | 2.144435 | 7.333066 | 3.483155 |
| 80 | 1.842639 | 1.457856 | 0.273647 | 1.940073 | 4.848391 | 1.839636 | 0.697023 | 5.082214 | −0.49772 | 1.265846 |
| 81 | 2.260225 | 2.91606 | 2.231082 | 0.948702 | 1.685389 | 1.229078 | 1.317989 | 0.500196 | −0.01689 | 0.362871 |
| 82 | 1.848128 | 2.266649 | 2.000135 | 2.067273 | 1.98612 | 0.872521 | 1.77568 | 1.381635 | 1.606243 | 1.100667 |
| 83 | 2.050222 | 1.769664 | 4.136681 | 0.991362 | 1.591019 | 1.002395 | 0.563141 | 3.31917 | 0.871761 | 2.483833 |
| 84 | 2.995917 | 4.459576 | 0.675952 | 1.834961 | 6.459377 | 1.180749 | 2.980459 | 0.021342 | 1.085598 | 4.443699 |
| 85 | 3.241827 | 3.951541 | 0.292112 | 3.156195 | 1.045823 | 2.567796 | 6.640217 | 1.758378 | 7.667192 | 1.433338 |
| 86 | 5.839828 | 1.021339 | 1.955114 | 0.330137 | 2.825643 | 1.409189 | 1.377006 | 4.501505 | 0.937661 | 1.188441 |
| 87 | 5.346889 | 4.976571 | 2.025469 | 1.868237 | 3.211039 | 2.600443 | 1.606333 | 4.980361 | 3.764488 | 10.07453 |
| 88 | 1.145162 | 2.080205 | 8.065453 | 1.681116 | 1.292717 | 5.401776 | 0.413219 | 2.538712 | −0.1181 | 1.676267 |
| 89 | 0.159914 | 0.911024 | 0.439598 | 0.949229 | 1.241001 | 0.833695 | 1.230266 | 1.934345 | 0.433397 | 2.051956 |
| 90 | 0.281646 | 4.015768 | 3.29415 | 1.460494 | 3.444675 | 3.580657 | 2.748301 | 0.61048 | 3.898863 | −0.11649 |
| 91 | 1.273179 | 1.159222 | 2.124325 | 4.152416 | 1.566976 | 1.442244 | 1.637513 | 1.271911 | 0.249909 | 4.56637 |
| 92 | 2.09023 | 1.660291 | 2.098827 | 1.212592 | 2.339586 | 2.339828 | 0.057284 | 1.839693 | 2.504063 | 1.422087 |
| 93 | 1.160903 | 1.947404 | 1.544115 | 3.637686 | 7.268027 | 1.869302 | −0.26023 | 1.45018 | 2.759198 | 2.320363 |
| 94 | 2.368279 | 2.797215 | 0.253873 | 1.922046 | 1.02288 | 2.275377 | 1.95974 | 2.009927 | 0.547938 | 0.994841 |
| 95 | 0.131111 | 3.666282 | 0.912989 | 1.766696 | 2.377035 | 1.497741 | 0.215968 | 5.50821 | 2.412296 | 1.409918 |
| 96 | 1.909105 | 1.391519 | 0.754716 | 2.946621 | 0.591488 | 0.697438 | 4.625332 | 11.96505 | 1.696662 | 0.626128 |
| 97 | 2.486862 | 4.884512 | 0.56886 | 1.87657 | 0.933245 | 1.737234 | 3.578601 | 0.880217 | 1.737356 | 1.019479 |
| 98 | 1.048904 | 0.32712 | 2.40151 | 5.091451 | 0.633543 | 3.61564 | 5.464441 | 3.841296 | 4.358212 | 0.232891 |
| 99 | 1.422904 | 4.716376 | 1.885859 | 0.185843 | −0.45857 | 2.343174 | 0.554551 | 2.215762 | 1.933104 | 2.166511 |
| 100 | 0.851585 | 3.550187 | 5.409757 | 1.464546 | 1.099907 | 0.004153 | 1.375824 | 1.650271 | 1.9786 | 4.619953 |

TABLE A2

10 Ordered Sets of 100 Resistances for Sample LEV ifr Calculation:

| Contact | Subset 1 | Subset 2 | Subset 3 | Subset 4 | Subset 5 | Subset 6 | Subset 7 | Subset 8 | Subset 9 | Subset 10 |
|---|---|---|---|---|---|---|---|---|---|---|
| 1 | 0.03835 | −0.17526 | 0.24845 | −0.36303 | −0.45857 | 0.004153 | −0.66037 | −0.51132 | −0.49772 | −0.41315 |
| 2 | 0.131111 | 0.02056 | 0.253873 | −0.15592 | −0.16546 | 0.14569 | −0.26023 | −0.0225 | −0.43371 | −0.11649 |
| 3 | 0.159914 | 0.036751 | 0.273647 | 0.185843 | −0.13614 | 0.373576 | 0.013914 | 0.021342 | −0.16354 | 0.004727 |
| 4 | 0.281646 | 0.084681 | 0.292112 | 0.221291 | 0.383821 | 0.400599 | 0.057284 | 0.206292 | −0.1181 | 0.037694 |
| 5 | 0.339501 | 0.087 | 0.340558 | 0.330137 | 0.393908 | 0.41531 | 0.084755 | 0.214749 | −0.01689 | 0.05839 |
| 6 | 0.348571 | 0.121284 | 0.421453 | 0.40022 | 0.404807 | 0.439413 | 0.104397 | 0.251258 | 0.172015 | 0.090552 |
| 7 | 0.468739 | 0.207812 | 0.439598 | 0.453288 | 0.436385 | 0.528421 | 0.126341 | 0.303127 | 0.19834 | 0.16003 |
| 8 | 0.483149 | 0.32712 | 0.453094 | 0.480791 | 0.452372 | 0.570848 | 0.138508 | 0.358209 | 0.249909 | 0.232891 |
| 9 | 0.544058 | 0.371639 | 0.56886 | 0.48119 | 0.517702 | 0.59299 | 0.215968 | 0.369243 | 0.433397 | 0.356973 |
| 10 | 0.556861 | 0.483534 | 0.588203 | 0.677062 | 0.587374 | 0.596559 | 0.326835 | 0.440991 | 0.477434 | 0.362871 |
| 11 | 0.620139 | 0.535001 | 0.614038 | 0.685994 | 0.591488 | 0.61861 | 0.367447 | 0.500196 | 0.547938 | 0.477968 |
| 12 | 0.734576 | 0.575794 | 0.675952 | 0.71981 | 0.633543 | 0.697438 | 0.369142 | 0.518008 | 0.557507 | 0.588061 |
| 13 | 0.741383 | 0.626361 | 0.685474 | 0.720389 | 0.655545 | 0.765037 | 0.413219 | 0.541499 | 0.574272 | 0.622221 |
| 14 | 0.752566 | 0.659684 | 0.711359 | 0.786062 | 0.67527 | 0.776808 | 0.49241 | 0.61048 | 0.583135 | 0.626128 |
| 15 | 0.840344 | 0.661292 | 0.754716 | 0.813596 | 0.69528 | 0.78555 | 0.521875 | 0.634817 | 0.710908 | 0.629221 |
| 16 | 0.851585 | 0.665818 | 0.883453 | 0.832665 | 0.713793 | 0.794966 | 0.554551 | 0.75674 | 0.728827 | 0.630009 |
| 17 | 0.856884 | 0.785342 | 0.912989 | 0.906105 | 0.742537 | 0.821502 | 0.563141 | 0.813043 | 0.796037 | 0.710548 |
| 18 | 0.86208 | 0.849777 | 0.931129 | 0.948702 | 0.805152 | 0.833695 | 0.697023 | 0.815381 | 0.815768 | 0.780772 |
| 19 | 0.872123 | 0.905911 | 0.978481 | 0.949229 | 0.89951 | 0.872521 | 0.697679 | 0.818532 | 0.843632 | 0.788108 |
| 20 | 0.95733 | 0.911024 | 1.060925 | 0.991362 | 0.916454 | 0.877975 | 0.757193 | 0.824884 | 0.849804 | 0.809865 |
| 21 | 0.963484 | 0.911144 | 1.140184 | 1.008458 | 0.933245 | 0.900482 | 0.832532 | 0.839463 | 0.871761 | 0.823417 |

TABLE A2-continued

10 Ordered Sets of 100 Resistances for Sample LEV ifr Calculation:

| Contact | Subset 1 | Subset 2 | Subset 3 | Subset 4 | Subset 5 | Subset 6 | Subset 7 | Subset 8 | Subset 9 | Subset 10 |
|---|---|---|---|---|---|---|---|---|---|---|
| 22 | 1.048904 | 0.914023 | 1.174294 | 1.015189 | 0.939737 | 0.937213 | 0.910839 | 0.880217 | 0.916889 | 0.831965 |
| 23 | 1.08239 | 0.935737 | 1.209712 | 1.026697 | 0.960844 | 0.939279 | 0.92815 | 1.016988 | 0.933665 | 0.888034 |
| 24 | 1.091998 | 1.016589 | 1.231379 | 1.032794 | 0.979578 | 0.997834 | 0.940954 | 1.090454 | 0.937661 | 0.918323 |
| 25 | 1.104005 | 1.021339 | 1.273676 | 1.053385 | 1.02288 | 1.002395 | 0.956131 | 1.13564 | 0.976698 | 0.924433 |
| 26 | 1.126132 | 1.027381 | 1.300157 | 1.062606 | 1.027371 | 1.006096 | 1.06375 | 1.146489 | 1.017386 | 0.943174 |
| 27 | 1.140308 | 1.047689 | 1.317212 | 1.065044 | 1.045823 | 1.040788 | 1.069292 | 1.159608 | 1.025915 | 0.977403 |
| 28 | 1.142211 | 1.054088 | 1.319049 | 1.097932 | 1.062785 | 1.042689 | 1.076932 | 1.197937 | 1.085598 | 0.987813 |
| 29 | 1.145162 | 1.078496 | 1.430306 | 1.114308 | 1.099907 | 1.044315 | 1.101418 | 1.213181 | 1.120237 | 0.994841 |
| 30 | 1.151879 | 1.090605 | 1.439188 | 1.118845 | 1.153689 | 1.097962 | 1.129718 | 1.227276 | 1.120431 | 1.019479 |
| 31 | 1.160903 | 1.096616 | 1.466961 | 1.19181 | 1.169737 | 1.163725 | 1.207382 | 1.271911 | 1.20625 | 1.100667 |
| 32 | 1.161958 | 1.106912 | 1.532604 | 1.193253 | 1.240577 | 1.180749 | 1.230266 | 1.288457 | 1.209573 | 1.123526 |
| 33 | 1.20937 | 1.110596 | 1.544115 | 1.212592 | 1.241001 | 1.229078 | 1.30264 | 1.300627 | 1.258867 | 1.129872 |
| 34 | 1.223891 | 1.159222 | 1.546883 | 1.216559 | 1.278558 | 1.252611 | 1.317989 | 1.341277 | 1.269829 | 1.150953 |
| 35 | 1.273179 | 1.164331 | 1.563298 | 1.227804 | 1.292717 | 1.298984 | 1.325192 | 1.347486 | 1.298348 | 1.165912 |
| 36 | 1.292161 | 1.184464 | 1.568873 | 1.244566 | 1.330117 | 1.335031 | 1.325531 | 1.35212 | 1.316007 | 1.168363 |
| 37 | 1.293352 | 1.185299 | 1.597522 | 1.246591 | 1.369498 | 1.364814 | 1.33116 | 1.381635 | 1.363455 | 1.180527 |
| 38 | 1.30311 | 1.228139 | 1.639379 | 1.279177 | 1.401402 | 1.391916 | 1.366509 | 1.413393 | 1.364584 | 1.188441 |
| 39 | 1.381786 | 1.260752 | 1.685402 | 1.305136 | 1.520583 | 1.409189 | 1.375824 | 1.440035 | 1.458193 | 1.207863 |
| 40 | 1.402657 | 1.281236 | 1.740861 | 1.305651 | 1.542813 | 1.414608 | 1.377006 | 1.45018 | 1.480782 | 1.265846 |
| 41 | 1.422904 | 1.295213 | 1.759657 | 1.370907 | 1.564321 | 1.442244 | 1.407895 | 1.536792 | 1.490326 | 1.275939 |
| 42 | 1.503337 | 1.361038 | 1.771488 | 1.428465 | 1.566976 | 1.497741 | 1.420147 | 1.580879 | 1.56292 | 1.295782 |
| 43 | 1.514436 | 1.365206 | 1.79138 | 1.443415 | 1.588132 | 1.501556 | 1.439355 | 1.584687 | 1.574246 | 1.363593 |
| 44 | 1.535744 | 1.391519 | 1.795147 | 1.460494 | 1.591019 | 1.514041 | 1.459988 | 1.625696 | 1.599125 | 1.385611 |
| 45 | 1.589894 | 1.403701 | 1.867906 | 1.464546 | 1.618529 | 1.517316 | 1.479591 | 1.650271 | 1.604597 | 1.386903 |
| 46 | 1.624203 | 1.422703 | 1.885859 | 1.533364 | 1.685389 | 1.547898 | 1.526051 | 1.655657 | 1.606243 | 1.409918 |
| 47 | 1.641574 | 1.457856 | 1.922325 | 1.537228 | 1.713499 | 1.593167 | 1.531284 | 1.727594 | 1.655709 | 1.415764 |
| 48 | 1.691392 | 1.5792 | 1.924916 | 1.560926 | 1.75124 | 1.688402 | 1.566444 | 1.74872 | 1.696662 | 1.418669 |
| 49 | 1.693959 | 1.62958 | 1.929058 | 1.567861 | 1.753242 | 1.727621 | 1.606333 | 1.758378 | 1.711032 | 1.422087 |
| 50 | 1.702144 | 1.660291 | 1.938355 | 1.578208 | 1.753626 | 1.737234 | 1.637513 | 1.787564 | 1.716576 | 1.433338 |
| 51 | 1.773382 | 1.66656 | 1.955114 | 1.681116 | 1.779297 | 1.773424 | 1.639549 | 1.814901 | 1.737356 | 1.43348 |
| 52 | 1.810457 | 1.712865 | 2.000135 | 1.730296 | 1.783114 | 1.808954 | 1.729331 | 1.836651 | 1.746161 | 1.489813 |
| 53 | 1.842639 | 1.736239 | 2.025469 | 1.766696 | 1.86075 | 1.839636 | 1.754449 | 1.839693 | 1.748993 | 1.586256 |
| 54 | 1.848128 | 1.769664 | 2.048984 | 1.818296 | 1.902309 | 1.869302 | 1.774379 | 1.934345 | 1.828936 | 1.601358 |
| 55 | 1.86467 | 1.86434 | 2.098827 | 1.834961 | 1.904455 | 2.066322 | 1.77568 | 2.009927 | 1.841927 | 1.676267 |
| 56 | 1.909105 | 1.895154 | 2.100104 | 1.868237 | 1.919399 | 2.105585 | 1.791882 | 2.067491 | 1.864455 | 1.712528 |
| 57 | 1.992421 | 1.937748 | 2.124325 | 1.875285 | 1.983028 | 2.136168 | 1.812467 | 2.099221 | 1.933104 | 1.75257 |
| 58 | 2.010445 | 1.947404 | 2.198201 | 1.87657 | 1.98612 | 2.225056 | 1.835401 | 2.10761 | 1.94289 | 1.795901 |
| 59 | 2.050222 | 1.971732 | 2.210214 | 1.900675 | 2.056762 | 2.275377 | 1.884134 | 2.144435 | 1.9786 | 1.814394 |
| 60 | 2.086868 | 2.042001 | 2.231082 | 1.908768 | 2.091409 | 2.292443 | 1.896435 | 2.215762 | 2.017495 | 1.8202 |
| 61 | 2.09023 | 2.080205 | 2.272768 | 1.922046 | 2.095155 | 2.295648 | 1.938725 | 2.228167 | 2.021563 | 1.845717 |
| 62 | 2.102298 | 2.152921 | 2.356618 | 1.940073 | 2.319609 | 2.31045 | 1.95974 | 2.24018 | 2.033853 | 1.888542 |
| 63 | 2.106154 | 2.169895 | 2.40151 | 1.987645 | 2.339828 | 2.339828 | 1.98143 | 2.258651 | 2.050686 | 1.924563 |
| 64 | 2.126412 | 2.233254 | 2.415676 | 2.067273 | 2.377035 | 2.343174 | 2.0088 | 2.261499 | 2.103357 | 1.98621 |
| 65 | 2.165783 | 2.250076 | 2.426071 | 2.154516 | 2.42362 | 2.348634 | 2.016991 | 2.273357 | 2.106597 | 1.99598 |
| 66 | 2.260225 | 2.266649 | 2.429325 | 2.265675 | 2.45479 | 2.36306 | 2.137864 | 2.361739 | 2.206171 | 2.017633 |
| 67 | 2.368279 | 2.273559 | 2.470485 | 2.272633 | 2.497972 | 2.445579 | 2.252029 | 2.4062 | 2.288818 | 2.051956 |
| 68 | 2.386782 | 2.459371 | 2.506345 | 2.390694 | 2.632819 | 2.460954 | 2.417146 | 2.455365 | 2.347182 | 2.098716 |
| 69 | 2.486862 | 2.6459 | 2.585623 | 2.506784 | 2.649232 | 2.546331 | 2.458275 | 2.538712 | 2.351714 | 2.166511 |
| 70 | 2.517309 | 2.654313 | 2.770751 | 2.537382 | 2.719829 | 2.567796 | 2.538379 | 2.629448 | 2.412296 | 2.189048 |
| 71 | 2.704012 | 2.771329 | 2.819023 | 2.541243 | 2.786627 | 2.58206 | 2.608354 | 2.79314 | 2.424099 | 2.320363 |
| 72 | 2.798903 | 2.780667 | 2.933231 | 2.587049 | 2.825643 | 2.594642 | 2.655811 | 2.826839 | 2.504063 | 2.349187 |
| 73 | 2.832379 | 2.797215 | 3.018099 | 2.606464 | 2.917477 | 2.600443 | 2.748301 | 2.857659 | 2.572032 | 2.448408 |
| 74 | 2.845789 | 2.846116 | 3.020118 | 2.758246 | 2.982074 | 2.617858 | 2.86362 | 2.864031 | 2.667815 | 2.461853 |
| 75 | 2.995917 | 2.87574 | 3.046573 | 2.762336 | 3.052101 | 2.83887 | 2.88927 | 2.87356 | 2.675051 | 2.483833 |
| 76 | 3.046854 | 2.91606 | 3.048675 | 2.767943 | 3.074675 | 2.933922 | 2.944182 | 3.021709 | 2.685832 | 2.583485 |
| 77 | 3.122286 | 2.939395 | 3.074544 | 2.801436 | 3.203055 | 3.052296 | 2.980459 | 3.126917 | 2.727424 | 2.599218 |
| 78 | 3.241827 | 3.244485 | 3.29415 | 2.815607 | 3.211039 | 3.166136 | 3.083378 | 3.127249 | 2.759198 | 2.636556 |
| 79 | 3.253619 | 3.269348 | 3.333236 | 2.853834 | 3.343656 | 3.219747 | 3.130244 | 3.31917 | 2.759695 | 2.791977 |
| 80 | 3.293616 | 3.279239 | 3.544742 | 2.902067 | 3.444675 | 3.24059 | 3.138999 | 3.471414 | 2.772146 | 2.822362 |
| 81 | 3.296498 | 3.378919 | 3.559951 | 2.946621 | 3.848178 | 3.25709 | 3.157112 | 3.801812 | 2.851852 | 2.933189 |
| 82 | 3.481664 | 3.486114 | 3.605533 | 2.956941 | 4.138659 | 3.294313 | 3.229754 | 3.841296 | 3.068238 | 2.975767 |
| 83 | 3.65464 | 3.489027 | 3.610053 | 2.95808 | 4.147529 | 3.302013 | 3.335609 | 3.986372 | 3.194614 | 2.988243 |
| 84 | 3.709176 | 3.496404 | 3.660316 | 2.978102 | 4.148995 | 3.580657 | 3.530855 | 4.348139 | 3.764488 | 3.117064 |
| 85 | 4.001323 | 3.550187 | 3.954124 | 2.978696 | 4.31292 | 3.61564 | 3.555315 | 4.358874 | 3.848714 | 3.161722 |
| 86 | 4.097074 | 3.666282 | 4.136681 | 2.985433 | 4.313755 | 3.826395 | 3.578601 | 4.501505 | 3.898863 | 3.17642 |
| 87 | 4.130866 | 3.760656 | 4.238269 | 3.028339 | 4.341955 | 3.969017 | 3.731981 | 4.570713 | 3.934191 | 3.180088 |
| 88 | 4.220009 | 3.776294 | 4.245165 | 3.156195 | 4.444957 | 4.001767 | 3.836858 | 4.725759 | 4.214113 | 3.483155 |
| 89 | 4.234312 | 3.92542 | 4.502436 | 3.249485 | 4.633267 | 4.155294 | 3.884106 | 4.773693 | 4.358212 | 3.586327 |
| 90 | 4.245694 | 3.951541 | 4.513126 | 3.637686 | 4.760292 | 4.388503 | 4.267747 | 4.77448 | 4.978893 | 3.673001 |
| 91 | 5.054253 | 4.015768 | 4.613342 | 4.048119 | 4.768249 | 4.58724 | 4.300359 | 4.980361 | 5.125327 | 3.868001 |
| 92 | 5.057095 | 4.128748 | 5.409757 | 4.152416 | 4.848391 | 4.608136 | 4.312324 | 5.082214 | 5.211963 | 3.916477 |
| 93 | 5.346889 | 4.365713 | 5.487671 | 4.256015 | 5.229651 | 4.854721 | 4.442872 | 5.279483 | 6.11574 | 4.312592 |
| 94 | 5.517509 | 4.459576 | 5.589202 | 4.343515 | 5.584969 | 5.401776 | 4.605852 | 5.367913 | 7.265125 | 4.443699 |
| 95 | 5.717011 | 4.716376 | 6.341065 | 4.432767 | 6.332108 | 5.658585 | 4.625332 | 5.50821 | 7.333066 | 4.56637 |
| 96 | 5.839828 | 4.826694 | 6.606189 | 4.512939 | 6.459377 | 5.909911 | 5.262642 | 6.808127 | 7.667192 | 4.619953 |
| 97 | 6.034668 | 4.884512 | 8.065453 | 4.525337 | 6.515682 | 6.087799 | 5.464441 | 7.084854 | 7.835976 | 5.9405 |

TABLE A2-continued

10 Ordered Sets of 100 Resistances for Sample LEV ifr Calculation:

| Contact | Subset 1 | Subset 2 | Subset 3 | Subset 4 | Subset 5 | Subset 6 | Subset 7 | Subset 8 | Subset 9 | Subset 10 |
|---|---|---|---|---|---|---|---|---|---|---|
| 98 | 6.522278 | 4.976571 | 10.52793 | 4.895019 | 7.268027 | 6.262381 | 6.190113 | 8.109097 | 8.407468 | 7.442511 |
| 99 | 7.619794 | 7.310713 | 10.71657 | 5.091451 | 7.629953 | 7.351255 | 6.640217 | 11.96505 | 10.96617 | 10.07453 |
| 100 | 8.462 | 30.27419 | 12.61419 | 6.296102 | 8.170996 | 7.789506 | 8.583798 | 12.19646 | 13.19501 | 10.1476 |

The invention claimed is:

1. A method for selecting a particular component from a plurality of possible components, wherein the particular component is utilized in an electronic system, the method comprising:
   performing, with a processor, accelerated life tests on the plurality of possible components resulting in accelerated life data for each possible component;
   determining, with a processor, the type of statistical distribution of each accelerated life data set, and if a distribution is an unbounded distribution;
   determining, with a processor, a failure rate by re-sampling the unbounded distributed accelerated life data; and
   providing the particular component for use in the electronic system if the failure rate is below a threshold failure rate;
   wherein re-sampling the unbounded distributed accelerated life data further comprises:
      subdividing, with a processor, the accelerated life data into a plurality of sub datasets;
      selecting, with a processor, the maximum accelerated life data point from each sub dataset, wherein the selected maximums form a maximum dataset; and
      fitting, with a processor, the maximum dataset to a Largest Extreme Value distribution.

2. The method of claim 1 wherein the Largest Extreme Value distribution as a function of "x" equals exp(−exp −(x−a)/b), and wherein "a" and "b" are parameters estimated using maximum likelihood estimates procedures.

3. The method of claim 1 wherein re-sampling the accelerated life data corresponding to each component further comprises:
   determining, with a processor, the probability that a sample from the maximum data set is greater than a predetermined critical value.

4. The method of claim 3 wherein re-sampling the accelerated life data corresponding to each component further comprises:
   adjusting, with a processor, the probability by dividing the probability by the quantity of further sub datasets;
   calculating the failure rate with a processor;
   adjusting for bias, with a processor; and
   determining a confidence interval with a processor.

5. A computer implemented method for determining failure rate of a component from accelerated life data, wherein a computer is configured for implementing the computer implemented method comprising:
   determining, with a computer, the type of statistical distribution of an accelerated life data set, and if the distribution is an unbounded distribution; and
   determining, with a computer, the failure rate of the component by re-sampling the accelerated life data of the component;
   wherein re-sampling the accelerated life data of the component further comprises:
      subdividing, with a computer, the accelerated life data into a plurality of sub datasets;
      selecting, with a computer, the maximum accelerated life data point from each sub dataset, wherein the selected maximums form a maximum dataset; and
      fitting, with a computer, the maximum dataset to a Largest Extreme Value distribution.

6. The computer implemented method of claim 5 wherein the Largest Extreme Value distribution as a function of "x" equals exp(−exp −(x−a)/b), and wherein "a" and "b" are parameters estimated using maximum likelihood estimates procedures.

7. The computer implemented method of claim 5 wherein re-sampling the accelerated life data of the component further comprises:
   determining, with a computer, the probability that a sample from the maximum data set is greater than a predetermined critical value.

8. The computer implemented method of claim 7 wherein re-sampling the accelerated life data of the component further comprises:
   adjusting, with a computer, the probability by dividing the probability by the quantity of further sub datasets;
   calculating the failure rate with a computer; and
   adjusting for bias with a computer.

9. A computer program product comprising a non-transitory computer usable medium having computer program logic recorded thereon for enabling a processor to determine the failure rate of a component, wherein the computer program logic when executed by the processor causes a computer to:
   determine the type of statistical distribution of an accelerated life data set, and if the distribution is an unbounded distribution; and
   determine the failure rate of the component by re-sampling the accelerated life data of the component;
   wherein upon the computer program logic for re-sampling the accelerated life data of the component is executed by the processor further causes a computer to:
      subdivide the accelerated life data into a plurality of sub datasets;
      select the maximum accelerated life data point from each sub dataset, wherein the selected maximums form a maximum dataset; and
      fit the maximum dataset to a Largest Extreme Value distribution.

10. The computer program product of claim 9 wherein re-sampling the accelerated life data of the component further comprises:
   determining the probability that a sample from the maximum data set is greater than a predetermined critical value.

11. The computer program product of claim 10 wherein re-sampling the accelerated life data of the component further comprises:
   adjusting the probability by dividing the probability by the quantity of further sub datasets;
   calculating the failure rate; and
   adjusting for bias.

* * * * *